(12) United States Patent
Ziraknejad et al.

(10) Patent No.: US 10,701,067 B1
(45) Date of Patent: Jun. 30, 2020

(54) CREDENTIAL MANAGEMENT USING WEARABLE DEVICES

(71) Applicant: MicroStrategy Incorporated, Vienna, VA (US)

(72) Inventors: Siamak Ziraknejad, Reston, VA (US); Victor Pena, Vienna, VA (US); Michael J. Saylor, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 176 days.

(21) Appl. No.: 15/136,449

(22) Filed: Apr. 22, 2016

Related U.S. Application Data

(60) Provisional application No. 62/292,826, filed on Feb. 8, 2016, provisional application No. 62/292,853, filed on Feb. 8, 2016, provisional application No. 62/152,691, filed on Apr. 24, 2015.

(51) Int. Cl.
*H04L 29/06* (2006.01)
*G06F 21/35* (2013.01)
*G06F 21/32* (2013.01)
*H04W 12/06* (2009.01)

(52) U.S. Cl.
CPC .......... *H04L 63/0853* (2013.01); *G06F 21/32* (2013.01); *G06F 21/35* (2013.01); *H04W 12/06* (2013.01)

(58) Field of Classification Search
CPC ........ G06F 21/32; G06F 21/35; H04W 12/06; H04L 63/0853
See application file for complete search history.

(56) References Cited

U.S. PATENT DOCUMENTS

| | | | |
|---|---|---|---|
| 6,108,656 A * | 8/2000 | Durst | G06F 17/30879 |
| 6,711,414 B1 * | 3/2004 | Lightman | G06Q 30/02 |
| | | | 340/853.2 |
| 6,720,860 B1 | 4/2004 | Narayanaswami | |
| 7,378,939 B2 | 5/2008 | Sengupta et al. | |

(Continued)

FOREIGN PATENT DOCUMENTS

WO  WO 2010052669  5/2010

OTHER PUBLICATIONS

"Apple Watch Programming Guide," Apple.com, Mar. 9, 2015, 81 pages.

(Continued)

*Primary Examiner* — Harunur Rashid
(74) *Attorney, Agent, or Firm* — Fish & Richardson P.C.

(57) ABSTRACT

Methods, systems, and apparatus, including computer-readable medium storing executable instructions, for credential management using wearable devices. In some implementations, an authentication request for a user is received. It is determined that a wearable device previously associated with the user is in proximity to the electronic device. In response to determining that the wearable device associated with the user is in proximity to the electronic device, a notification is sent to the wearable device for output by the wearable device. Approval data is received indicating user interaction with the wearable device approving authentication in response to the notification. Data indicating approval of the authentication request is provided in response to receiving the approval data from the wearable device.

21 Claims, 26 Drawing Sheets

(56) References Cited

U.S. PATENT DOCUMENTS

| | | | |
|---|---|---|---|
| 7,400,878 B2 | 7/2008 | Hassan et al. | |
| 7,600,676 B1 | 10/2009 | Rados et al. | |
| 7,979,899 B2 | 7/2011 | Guo et al. | |
| 8,286,227 B1 | 10/2012 | Zheng | |
| 8,307,406 B1 | 11/2012 | Aboujaoude | |
| 8,371,501 B1 | 2/2013 | Hopkins | |
| 8,498,618 B2 | 7/2013 | Ben Ayed | |
| 8,601,602 B1 | 12/2013 | Zheng | |
| 8,621,005 B2 | 12/2013 | Boyd et al. | |
| 8,625,796 B1* | 1/2014 | Ben Ayed | H04L 63/0853 380/258 |
| 8,711,656 B1 | 4/2014 | Paulson | |
| 8,955,081 B2 | 2/2015 | Metke | |
| 9,075,979 B1 | 7/2015 | Queru | |
| 9,301,139 B2 | 3/2016 | Korgaonkar | |
| 9,520,918 B2 | 12/2016 | Adrangi | |
| 9,741,033 B2 | 8/2017 | Bhatnagar | |
| 9,942,222 B1* | 4/2018 | Fenton | H04L 63/0853 |
| 2002/0180586 A1 | 12/2002 | Kitson et al. | |
| 2002/0194500 A1 | 12/2002 | Bajikar | |
| 2003/0046589 A1 | 3/2003 | Gregg | |
| 2003/0065919 A1 | 4/2003 | Albert | |
| 2004/0203595 A1 | 10/2004 | Singhal | |
| 2004/0243856 A1 | 12/2004 | Shatford | |
| 2005/0044393 A1 | 2/2005 | Holdsworth | |
| 2005/0221798 A1 | 10/2005 | Sengupta et al. | |
| 2005/0268107 A1 | 12/2005 | Harris et al. | |
| 2005/0269401 A1 | 12/2005 | Spitzer et al. | |
| 2006/0015358 A1* | 1/2006 | Chua | G06Q 20/02 705/44 |
| 2006/0083208 A1 | 4/2006 | Lin | |
| 2006/0242423 A1 | 10/2006 | Kussmaul | |
| 2007/0061590 A1 | 3/2007 | Boye et al. | |
| 2007/0130472 A1 | 6/2007 | Buer | |
| 2008/0016537 A1 | 1/2008 | Little | |
| 2008/0052775 A1 | 2/2008 | Sandhu | |
| 2008/0250147 A1 | 10/2008 | Knibbeler et al. | |
| 2008/0289030 A1 | 11/2008 | Poplett | |
| 2009/0093215 A1 | 4/2009 | Eisenbach | |
| 2009/0158414 A1* | 6/2009 | Chaudhry | H04L 63/0823 726/10 |
| 2009/0313687 A1 | 12/2009 | Popp | |
| 2010/0031345 A1 | 2/2010 | Sinclair | |
| 2010/0063895 A1 | 3/2010 | Domingues et al. | |
| 2010/0120406 A1 | 5/2010 | Banga | |
| 2010/0275010 A1 | 10/2010 | Ghirardi | |
| 2011/0081860 A1 | 4/2011 | Brown | |
| 2011/0169654 A1 | 7/2011 | Ketari | |
| 2011/0221590 A1 | 9/2011 | Baker | |
| 2012/0066749 A1 | 3/2012 | Taugbol et al. | |
| 2012/0272279 A1 | 10/2012 | Lim | |
| 2013/0041938 A1 | 2/2013 | Lin | |
| 2013/0159699 A1 | 6/2013 | Torkkel | |
| 2013/0173915 A1 | 7/2013 | Haulund | |
| 2013/0237190 A1 | 9/2013 | Smith | |
| 2013/0268881 A1 | 10/2013 | Bartkiewicz | |
| 2014/0040991 A1 | 2/2014 | Potonniee | |
| 2014/0062874 A1 | 3/2014 | Suggs | |
| 2014/0067678 A1 | 3/2014 | Lee | |
| 2014/0108810 A1 | 4/2014 | Chenna | |
| 2014/0173695 A1 | 6/2014 | Valdivia | |
| 2014/0189808 A1 | 7/2014 | Mahaffey | |
| 2014/0273845 A1 | 9/2014 | Russell | |
| 2014/0298432 A1* | 10/2014 | Brown | H04L 63/083 726/6 |
| 2014/0330560 A1 | 11/2014 | Venkatesha et al. | |
| 2014/0337956 A1 | 11/2014 | Korgaonkar | |
| 2014/0366123 A1 | 12/2014 | DiBona et al. | |
| 2015/0074230 A1 | 3/2015 | Lee | |
| 2015/0121488 A1 | 4/2015 | Vaughn | |
| 2015/0135310 A1* | 5/2015 | Lee | A61B 5/681 726/20 |
| 2015/0178721 A1 | 6/2015 | Pandiarajan | |
| 2015/0270971 A1 | 9/2015 | Dietrich | |
| 2015/0302856 A1 | 10/2015 | Kim et al. | |
| 2015/0319142 A1 | 11/2015 | Herberg | |
| 2015/0350894 A1 | 12/2015 | Brand | |
| 2015/0358315 A1* | 12/2015 | Cronin | H04L 63/0861 726/6 |
| 2015/0362997 A1* | 12/2015 | Hatton | G06F 3/017 701/12 |
| 2016/0192194 A1 | 6/2016 | Yang | |
| 2016/0267732 A1* | 9/2016 | Agrafioti | G06F 21/40 |
| 2016/0378992 A1 | 12/2016 | Nguyen | |
| 2017/0237565 A1 | 8/2017 | Rommel | |
| 2018/0037194 A1* | 2/2018 | Senzaki | B60R 25/01 |

OTHER PUBLICATIONS

"Apple Watch User Guide, Version 1.0," Apple.com, Apr. 23, 2015, 96 pages.

"Availability of two-factor authentication in iOS 9 and OS X El Capitan," Apple.com, Apr. 5, 2016, URL<https://support.apple.com/en-us/HT205075>, 3 pages.

"Google Nexus Unlock," Google Support, accessed on Apr. 19, 2016, URL<https://support.google.com/nexus/answer/6093922>, 7 pages.

"With a Flick of the Wrist, Security Just Got Even Easier," Duo Security Blog, May 5, 2015, URL<https://duo.com/blog/duo-for-apple-watch>, 10 pages.

Buckley, "Here's The Official Apple Watch User Guide," Gizmodo, Apr. 23, 2015, URL<http://gizmodo.com/heres-the-official-apple-watch-user-guide-1699820199>, 2 pages.

Hall, "Apple Watch uses constant skin contact to validate Apple Pay purchases," 9to5Mac, Sep. 10, 2014, URL<http://9to5mac.com/2014/09/10/apple-watch-uses-constant-skin-contact-to-validate-apple-pay-purchases/>, 9 pages.

Lee, "Apple Watch Will Use Skin Contact to Authenticate Contactless Payments," Ubergizmo, Sep. 10, 2014, URL<http://www.ubergizmo.com/2014/09/apple-watch-will-use-skin-contact-to-authenticate-contactless-payments/>, 2 pages.

Miners, "5 things the Apple Watch can do, and 5 things it can't," PCWorld, Sep. 10, 2014, URL<http://www.pcworld.com/article/2605140/5-things-the-apple-watch-can-and-cant-do.html>, 6 pages.

"MacID: Unlock your Mac with just your fingerprint," Kane Cheshire, Mar. 2015, [retrieved on Dec. 30, 2015]. Retrieved from the Internet: URL<http://macid.co/>. 4 pages.

"Near Lock—Lock and unlock your Mac with your iPhone," Oct. 2014, [retrieved on Dec. 30, 2015]. Retrieved from the Internet: URL<http://nearlock.me/>. 6 pages.

"Near Lock—Lock and unlock your Mac with your iPhone: FAQ," Dec. 2014, [retrieved on Dec. 30, 2015]. Retrieved from the Internet: URL<http://nearlock.me/faq>. 3 pages.

Barker, Ian, 'Betanews.com,' "MicroStrategy platform Ushers in password-free security," Apr. 2015, [retrieved on Dec. 30, 2016]. Retrieved from the Internet: URL<https://betanews.com/2015/04/02/microstrategy-platform-ushers-in-password-free-security/>. 1 page.

Cahill et al., "MicroStrategy Introduces Enterprise Security Platform Usher™, Debuts Usher Software Development Kit," MicroStrategy Inc., Apr. 2015, 2 pages.

Fazackerley, Mark, "Usher Functionality," LinkedIn Corporation, Apr. 2014, retrieved from the Internet: URL<http://www.slideshare.net/markfazackerley3/usher-functionality >. 16 pages.

Fidoalliance.org' [online]. "Mobile Connect & FIDO," GSMA, 2014, retrieved from the Internet: URL<https://fidoalliance.org/wp-content/uploads/David-Poillington-GSMA.pdf>. 11 pages.

Hellotether.com' [online]. "Lock and unlock your Mac automatically with your iPhone," Fi a Fo Ltd., Dec. 2015, URL<www.hellotether.com>. 10 pages.

Kastrenakes, Jacob, "Knock app lets you unlock your Mac by tapping your iPhone," The Verge, Nov. 2013, [retrieved on Dec. 30, 2015]. Retrieved from the Internet: URL<http://www.theverge.com/2013/11/5/5069614/knock-iphone-app-wirelessly-unlocks-your-mac>. 2 pages.

Knocktounlock.com' [online]. "Introducing Knock 2.0: Unlock your Mac faster and more securely than ever," Aug. 2013, [retrieved on Dec. 30, 2015]. Retrieved from the Internet: URL<http://www.knocktounlock.com>. 3 pages.

(56) References Cited

OTHER PUBLICATIONS

Knocktounlock.com' [online]. "Knock FAQ: Faster and safer than typing a password. Just Knock. For iPhone + Mac," Nov. 2013, [retrieved on Dec. 30, 2015]. Retrieved from the Internet: URL<http://www.knocktounlock.com/faq/>. 8 pages.

Knocktounlock.com' [online]. "Knock/Help: Search for answers," Mar. 2014, [retrieved on Dec. 30, 2015]. Retrieved from the Internet: URL<http://help.knocktounlock.com/>. 5 pages.

Lee, Justin, "Inside MicroStrategy's biometric mobile identity platform Usher," Biometrics Research Group, Inc., Apr. 2015, [retrieved on Dec. 30, 2016]. Retrieved from the Internet: URL<http://www.biometricupdate.com/201504/inside-microstrategys-biometric-mobile-identity-platform-usher>. 1 page.

Macrumors.com' [online]. "'Knock' Aims to Let you Unlock Your Mac With Your Apple Watch," Apr. 2015, [retrieved on Dec. 30, 2015]. Retrieved from the Internet: URL<http://www.macrumors.com/2015/04/22/knock-unlock-mac-with-apple-watch/>. 8 pages.

MicroStrategy.com' [online]. "Introduction to Usher," MicroStrategy Inc., Jun. 2014, retrieved from the Internet: URL<https://mobileapps.microstrategy.com/usher/MSTREmployeeFAQ/MSTREmployeeFAQ.html>. 10 pages.

MicroStrategy.com' [online]. "Usher Help: Version 2.4.07," MicroStrategy Inc., 2015, retrieved from the Internet: URL<http://www2.microstrategy.com/producthelp/Usher/2.4.07/UsherHelp.pdf>. 197 pages.

MicroStrategy.com' [online]. "Usher Mobile Identity Platform: Deliver biometric-caliber security across the enterprise," MicroStrategy Inc., Jan. 2014, retrieved from the Internet: URL<https://www.microstrategy.com/Strategy/media/downloads/products/usher_overview-presentation.pdf>. 24 pages.

MicroStrategyhelp.atlassian.net' [online]. "Usher Security," Mar. 2016, [retrieved on Dec. 30, 2016]. Retrieved from the Internet: URL<https://microstrategyhelp.atlassian.net/wiki/display/README103/Usher+Security>. 10 pages.

Mobileconnect.io' [online]. "Secure digital identity is now in your hands: Mobile Connect is a new service that lets you login to websites and apps on any device without having to remember usernames or passwords. You are safely identified through your mobile number," Mobile Connect, Mar. 2015, URL<https://mobileconnect.io/>. 12 pages.

Usher.com' [online]. "Usher Mobile Identity Platform: Security Architecture," MicroStrategy Inc., 2014, retrieved from the Internet: URL<https://www.microstrategy.com/Strategy/media/downloads/white-papers/Usher-v2-1ArchitectureWhitepaper.pdf >. 20 pages.

Wikipedia.com' [online]. "Bluetooth," Jan. 2004, [retrieved on Mar. 10, 2017]. Retrieved from the Internet: URL<https://en.wikipedia.org/wiki/Bluetooth>. 25 pages.

Wikipedia.com' [online]. "Pretty Good Privacy," Jan. 2004, [retrieved on Mar. 11, 2017]. Retrieved from the Internet: URL<https://en.wikipedia.org/wiki/Pretty_Good_Privacy>. 12 pages.

Wikipedia.com' [online]. "Public key infrastructure," Jan. 2004, [retrieved on Dec. 20, 2016]. Retrieved from the Internet: URL<https://en.wikipedia.org/wiki/Public_key_infrastructure>. 7 pages.

Wikipedia.com' [online]. "Public-key cryptography," Jan. 2004, [retrieved on Mar. 13, 2017]. Retrieved from the Internet: URL<https://en.wikipedia.org/wiki/Public-key_cryptography>. 16 pages.

Wikipedia.com' [online]. "Security Assertion Markup Language," Nov. 2016, retrieved from the Internet: URL<https://en.wikipedia.org/wiki/Security_Assertion_Markup_Language>. 5 pages.

Wikipedia.com' [online]. "Security token," Apr. 2005, [retrieved on Feb. 18, 2017]. Retrieved from the Internet: URL<https://en.wikipedia.org/wiki/Security_token>. 8 pages.

Jansen et al., "Proximity-based Authentication for Mobile Devices," Proceedings of the 2005 International Conference on Security and Management, pp. 398-404, Jun. 20, 2005.

Jaros et al., "A New Approach in a Multifactor Authentication and Location-based Authorization," ICIMP 2011: The Sixth International Conference on Internet Monitoring and Protection, pp. 50-53, Mar. 20, 2011.

Bertino et al., "Location-Aware Authentication and Access Control—Concepts and Issues," 2009 International Conference on Advanced Information Networking and Applications, 2009, pp. 10-15.

"The Usher Identity Platform: A description of MicroStrategy's mobile identity solution," Usher by MicroStrategy, Apr. 17, 2014, 15 pages.

"Usher Mobile Identity Platform: Deliver biometric-caliber security across the enterprise," Usher by MicroStrategy, Jan. 11, 2014, 24 pages.

"Usher Mobile Identity Platform: Security Architecture," Usher by MicroStrategy, Jul. 23, 2014, 20 pages.

* cited by examiner

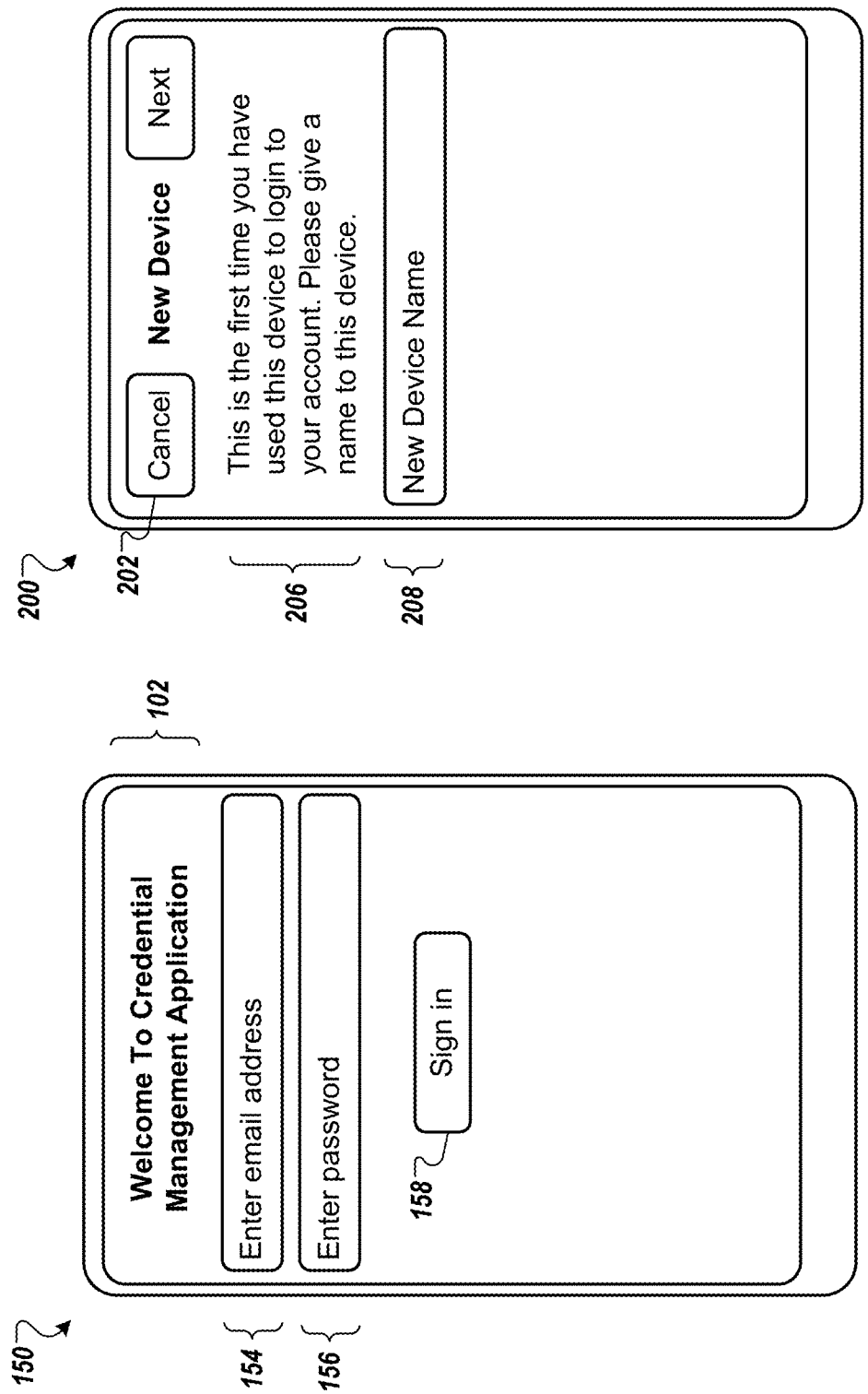

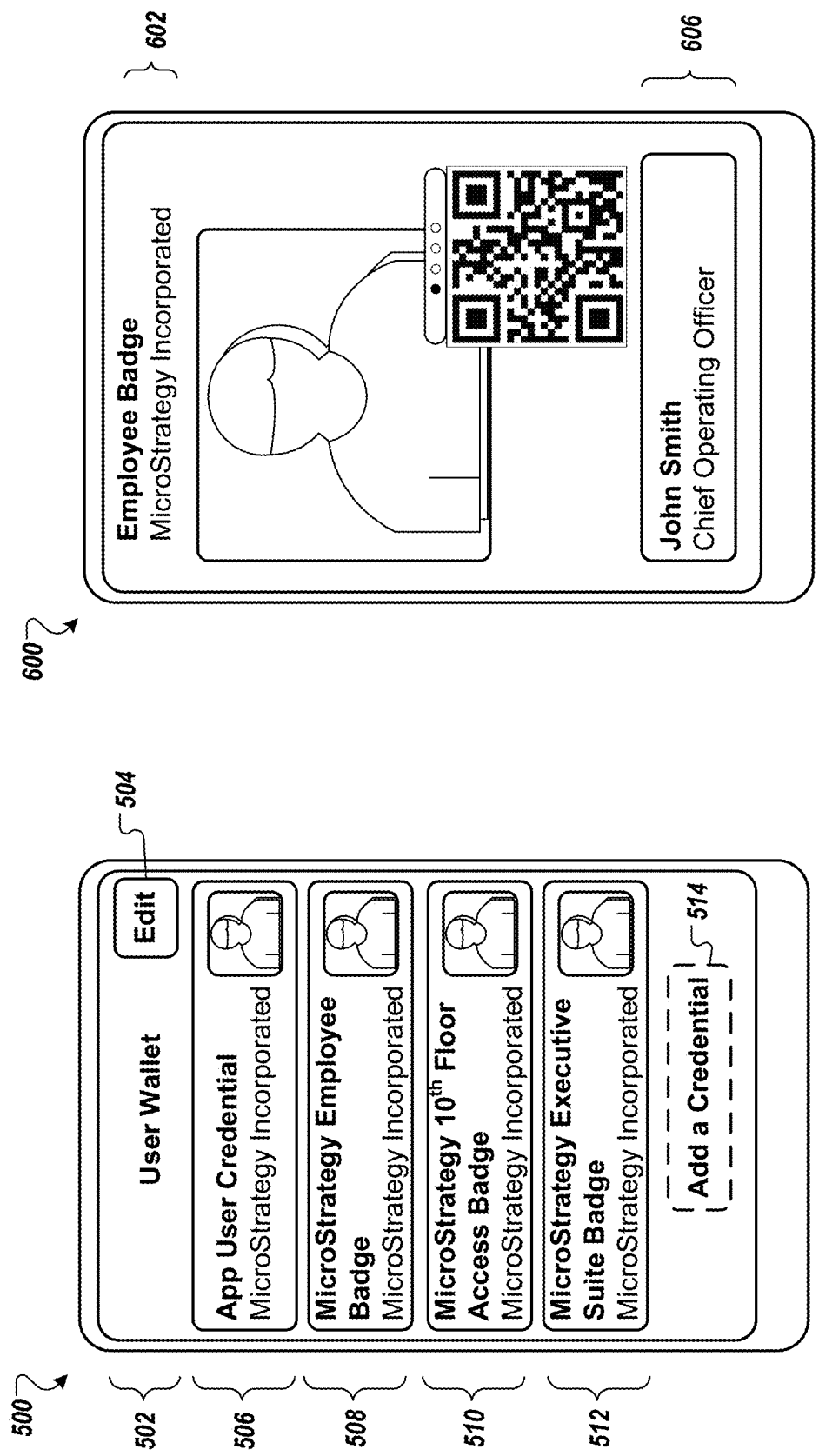

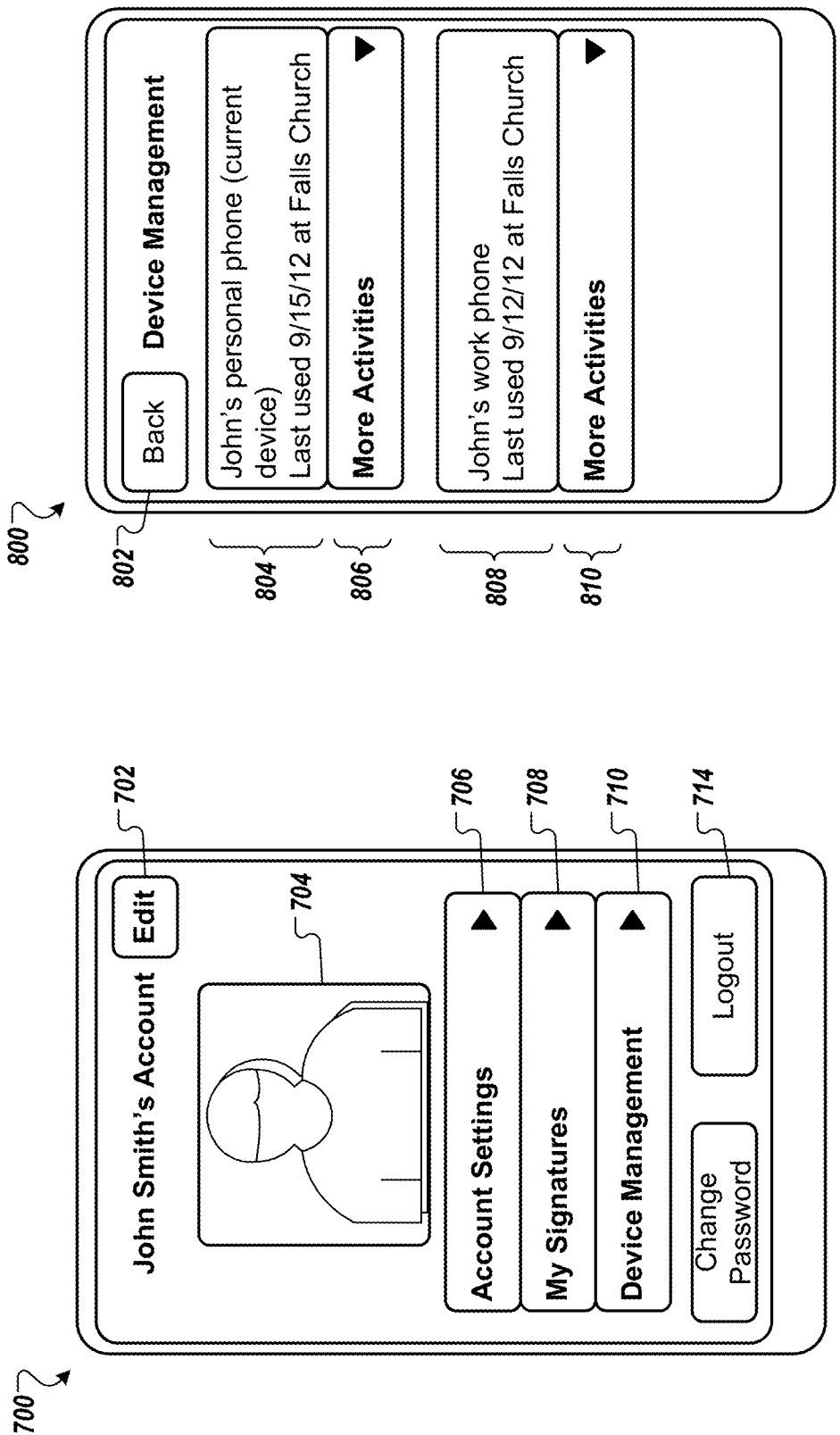

CREDENTIAL MANAGEMENT USING WEARABLE DEVICES

CROSS-REFERENCE TO RELATED APPLICATIONS

This application claims the benefit of U.S. Provisional Patent Application No. 62/152,691, filed on Apr. 24, 2015 and titled "CREDENTIAL MANAGEMENT USING WEARABLE DEVICES," U.S. Provisional Patent Application No. 62/292,826, filed on Feb. 8, 2016 and titled "PROXIMITY-BASED DEVICE ACCESS," and U.S. Provisional Patent Application No. 62/292,853, filed on Feb. 8, 2016 and titled "PROXIMITY-BASED LOGICAL ACCESS." The entire contents of application nos. 62/152,691, 62/292,826, and 62/292,853 are incorporated herein by reference.

TECHNICAL FIELD

This specification generally relates to credential management using wearable devices.

BACKGROUND

Organizations and enterprises often issue keys to permit access to secured resources. Many resources, such as web pages or secure locations, may require authentication or verification of a user's identity to obtain access.

SUMMARY

In some implementations, a system can use a wearable device, such as a watch, to enhance a user's experience when authenticating to access a secure resource. When a wearable device has been appropriately registered with a particular user account or credential, the presence of the wearable device can substitute for other authentication actions. Thus, when a device that requires authentication or processes an authentication request detects the proximity of the appropriate wearable device, the amount of user interaction required to complete the authentication may be reduced. When a user has authenticated to the wearable device, e.g., by entering an unlock passcode, the prior authentication may be considered valid as long as the wearable device is worn continuously. Thus, when a device would normally require user input of a passcode, biometric identifier, or other authentication input, the proximity of a previously authenticated and continuously worn wearable device can be accepted as proof of authentication instead. This can permit authentication with no input from the user, or mere confirmation by the user. Even when a required security level requires input from a user, the wearable device may provide the interactive interface to receive that input, which can greatly increase usability.

The wearable device may be used as part of a credential management system that manages the issuance, use, and revocation of many different credentials. For example, the wearable device may be registered with the credential management system for a particular user, and be used to allow the user access to multiple different credentials issued by different organizations. Different credentials may have different policies and conditions that limit the manner of use of the credentials. The wearable device, along with another user device such as a phone, and in some implementations a server system may ensure that each use of a credential satisfies appropriate authentication requirements for the context in which use is attempted. The state of the wearable device, e.g., whether the user has unlocked the watch or entered a passcode for the operating system of the wearable device, may be one of the factors used to determine whether the credential management system should grant access to other devices by applying other credentials issued to the user and managed by the credential management system.

In one general aspect, a method performed by an electronic device includes: receiving, by the electronic device, an authentication request for a user; determining, by the electronic device, that a wearable device previously associated with the user is in proximity to the electronic device; in response to determining that the wearable device associated with the user is in proximity to the electronic device, sending, by the electronic device, a notification to the wearable device for output by the wearable device; receiving, by the electronic device, approval data indicating user interaction with the wearable device approving authentication in response to the notification; and providing, by the electronic device, data indicating approval of the authentication request in response to receiving the approval data from the wearable device.

In some implementations, determining, by the electronic device that the wearable device associated with the user is in proximity to the electronic device includes determining that the wearable device has been continuously worn since the user authenticated to the wearable device.

In some implementations, determining that the wearable device has been continuously worn since the user authenticated to the wearable device includes determining that the wearable device has been continuously worn based on skin sensor data or heartbeat data from the wearable device.

In some implementations, determining, by the electronic device that the wearable device associated with the user is in proximity to the electronic device includes: receiving, by the electronic device, a signal from the wearable device over a short-range wireless connection; and determining that the wearable device is in proximity of the electronic device based on the received signal from the wearable device.

In some implementations, determining, by the electronic device, that the wearable device associated with the user is in proximity to the electronic device includes determining that the wearable device has been previously paired with the electronic device or registered with a user account for the user. In some implementations, the wearable device is a watch.

In some implementations, sending the notification to the wearable device includes sending data configured to cause the watch to output the notification on a display of the watch.

In some implementations, the display of the watch is a touchscreen display, and receiving the approval data indicating user interaction with the wearable device includes receiving approval data indicating user interaction with an approval control displayed on the touchscreen of the watch in response to the notification.

In some implementations, the electronic device is a mobile phone, the mobile phone being configured to output an alert in response to receiving the authentication request when a wearable device is not in proximity to the mobile phone. The method includes determining, by the mobile phone, to not output the alert corresponding to the authentication request based on determining that the wearable device associated with the user is in proximity to the electronic device. Sending the notification to the wearable device includes sending the notification to the wearable device instead of outputting the alert at the mobile phone.

In some implementations, receiving the authentication request includes receiving, by the electronic device, the authentication request from a server over a network. Providing the data indicating approval of the authentication request includes providing the data indicating approval of the authentication request to the server over the network.

In some implementations, receiving the authentication request includes receiving, by the electronic device, an authentication request from a resource device over a short-range wireless connection. Providing the data indicating approval of the authentication request includes providing the data indicating approval of the authentication request to the resource device over the short-range wireless connection.

In some implementations, the method includes: determining, by the electronic device, that the wearable device is locked or has not been worn continuously since a most recent authentication of the user to the wearable device; in response to determining that the wearable device is locked or has not been worn continuously since the most recent authentication of the user to the wearable device, sending data to the wearable device requesting that the user authenticate to the wearable device; and receiving, by the electronic device, data indicating that the user authenticated to the wearable device. Providing the data indicating approval of the authentication request in response to receiving the approval data from the wearable device is based on data indicating that the user authenticated to the wearable device.

In some implementations, sending the sending the notification to the wearable device includes forwarding the authentication request received by the electronic device to the wearable device.

In some implementations, sending the notification includes sending a notification configured to cause display, on the wearable device, of an interactive approval control to approve the authentication with a single interaction of the user.

In some implementations, receiving the authentication request includes receiving an authentication request corresponding to a particular user credential issued to the user, the particular user credential being different from credentials of the user to access the electronic device and the wearable device. Determining, by the electronic device, a policy associated with the particular credential.

In some implementations, the policy indicates that an additional authentication factor is required when one or more conditions occur, and the method includes: providing, by the electronic device, a notification requesting user input for the second authentication factor; after providing the notification, receiving, by the electronic device, user input for the second authentication factor; and providing, by the electronic device, the user input for the second authentication factor to a server system.

In some implementations, the policy indicates that an additional authentication factor is required when one or more conditions occur, and the method includes determining, by the electronic device, that the one or more conditions of the policy associated with the credential have not occurred. Providing the data indicating approval of the authentication request includes is performed in response to determining that the one or more conditions of the policy associated with the credential have not occurred.

In some implementations, the method includes determining that the particular user credential is valid. Sending the notification to the wearable device or providing the data indicating approval of the authentication request is performed in response to determining that the user credential corresponding to the association is valid.

In some implementations, the policy includes a reporting policy corresponding to the particular user credential, and the method further includes transmitting, by the electronic device, information specified by the reporting policy.

In some implementations, determining the reporting policy corresponding to the credential includes determining that the reporting policy directs transmission of geolocation data, beacon data, application context data, movement data, or authentication history data; and transmitting the information specified by the reporting policy includes transmitting the geolocation data, beacon data, application context data, movement data, or authentication history data directed by the reporting policy to a server system over a network.

In another general aspect, a method performed by an electronic device includes: receiving, by the electronic device, an authentication request for a user; determining, by the electronic device, that a wearable device previously associated with the user is in proximity to the electronic device; determining, by the electronic device, that the wearable device has been worn continuously since a previous authentication of the user; and providing, by the electronic device, data indicating approval of the authentication request in response to determining, by the electronic device, that the wearable device has been worn continuously since a previous authentication of the user.

The details of one or more implementations are set forth in the accompanying drawings and the description, below. Other features will be apparent from the description and drawings, and from the claims.

DESCRIPTION OF DRAWINGS

FIG. 5A is an illustration of an example of a user interface that enables a user to login to a credential management application on a client device.

FIG. 5B is an illustration of an example of a user interface of a credential management application for registering a new device.

FIG. 5E is an illustration of an example of a user interface that enables a user to select from among various credentials associated with the user.

FIG. 6 is an illustration of an example representation of a credential.

FIG. 7 is an illustration of an example of an account management screen in a credential management application.

FIG. 8 is an illustration of an example of an activity log in a credential management application.

DETAILED DESCRIPTION

Figure 1A:
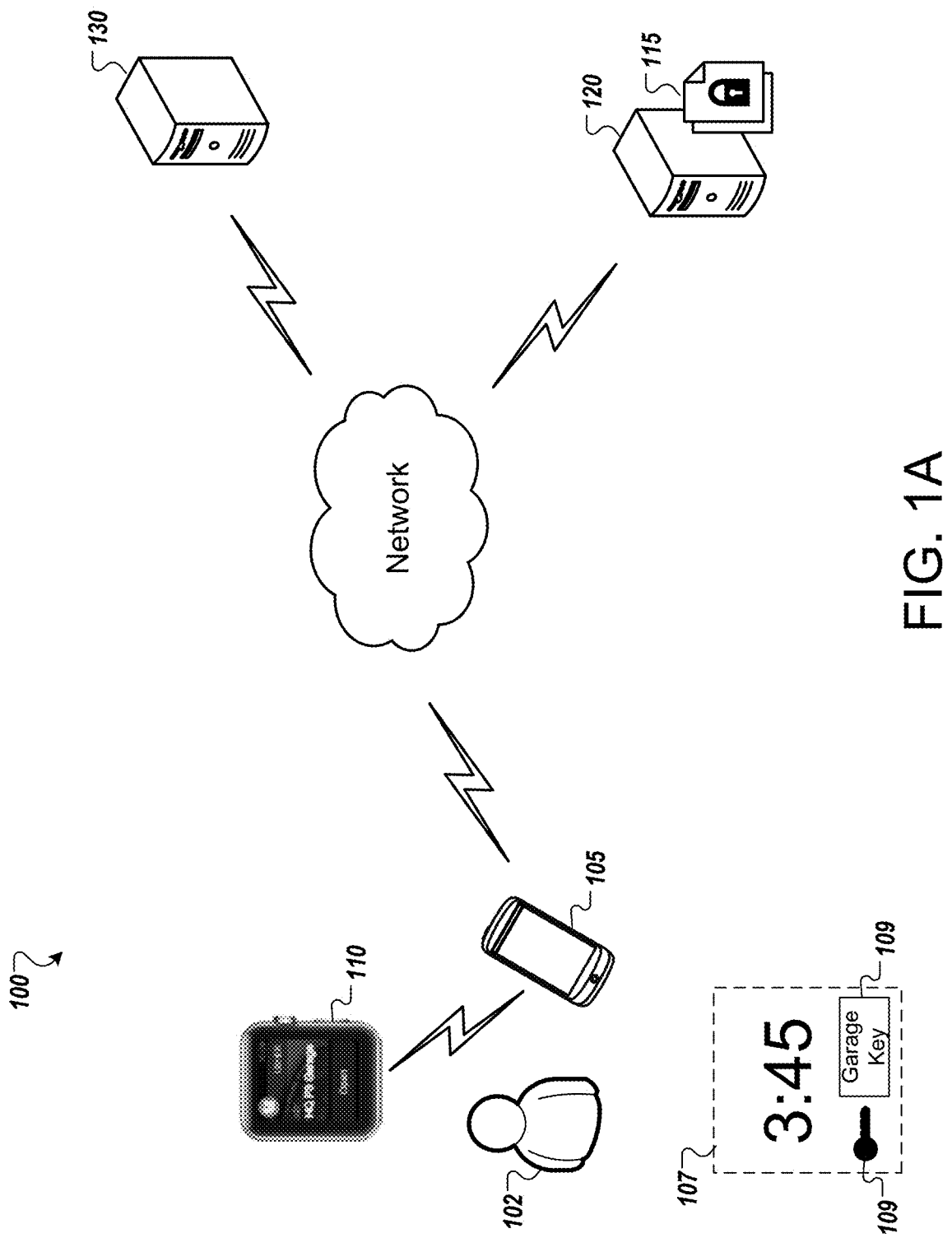
FIGS. 1A-1C are diagrams of example systems for credential management using wearable devices.

A user identity management platform may integrate functionality for authenticating users and managing credentials with a smart watch or other wearable device. The integration can promote ease of use of the system, for example, reducing the complexity and time required for a user to authenticate or access a credential. Other aspects can enhance security, for example, using information from the smart watch as additional verification of user identity or authorization for use of a credential.

According to some implementations, representations of credentials for groups of users or for individual users may be generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from the credential management applications executed on client devices; and credentials can be represented in various forms as described below. For example, credentials can be represented by parametrically-generated graphical representations, animated graphical representations, phrases, numeric representations, and/or optical machine-readable representations (e.g., bar codes or QR codes). A server, or collection of servers, can manage and distribute credentials to appropriate users' client devices.

Different credentials may be issued by different credential issuing organizations. For example, a company may have an associated credential issuing organization issuing credentials for its employees that are used for accessing various company resources, whereas a physical fitness chain may have another associated credential issuing organization that issues credentials to its members for accessing the fitness centers managed by the chain. The credentials issued by different credential issuing organizations may be managed using the credential management system, which enables a first user of the credential management system to validate a credential presented by a second user of the credential management system irrespective of the credential issuing organization that issued the credential. Responsive to successful validation of a credential, information associated with the validated credential (including information about the credentialed second user) may be disseminated to the validating first user.

A credential management application may be installed on a client device through various suitable means. For example, a user may install the credential management application from an application store. In another example, the user may install the credential management application from a server through a web page or web interface.

The credential management application may enable a user to access one or more of the user's credentials from one or multiple client devices. To prevent fraudulent use of a user's credentials from a client device, the credential management application may require the user to authenticate their identity and register each of the user's client devices with a credential management server. The credential management server may issue a certificate to each of the user's client devices, such that the credential management server can recognize the client devices as having been registered with the user's account.

FIG. 1A illustrates an example of a system 100 that includes a watch 110 or other wearable device that is used to facilitate authentication and credential management. In the system 100, a user 102 has a smart phone 105 and a smart watch 110. The user 102 can access secured resources 115, such as those provided by a web server 120 that requires authentication. The system 100 also includes a credential management server 130. The credential management server may receive an analysis of data to determine whether a user should properly be authenticated for use of a credential to access the secured resources 115.

The smart watch 110 can include one or more processors, memory, and other components to permit execution of applications and interaction with other devices. For example, the smart watch 110 can have software with user-customizable options, and/or may permit downloading and installation of various third-party software modules or applications that are selected by the user.

The smart watch 110 can include various output mechanisms, such as a screen for displaying information, a speaker for producing audible sounds, and vibrator or other device to produce tactile feedback. Typical screens may include a grid of pixels, for example, in a rectangular shape or other configuration, that allow many different images to be rendered and displayed. The smart watch 110 can also include various input mechanisms to receive user input, for example, a microphone to receive voice input, a touch screen to receive taps, swipes, and other gestures, physical controls such as buttons, dials, sliders, or switches. The smart watch 110 can also include input mechanisms to detect other conditions, such as a temperature sensor, a gyroscopic sensor, accelerometers, a pulse or heartbeat sensor, a skin or wrist detection sensor, sensors to detect magnetic or electrical signals, and so on.

The smart watch 110 may communicate with the phone 105 or other devices using a wireless link, such as Wi-Fi or Bluetooth. In some implementations, the smart watch 110 uses a short-range wireless communication system, configured to communicate with devices within a particular range, e.g., 5 feet, 10 feet, 15 feet, and so on. Depending on the implementation, the smart watch 110 may communicate with the phone 105 and/or other devices using other communications techniques, including, for example, cellular networks (e.g., 2G, 3G, 4G, LTE networks, using GSM, CDMA or other techniques), infrared (IR) communications, optical codes such as bar codes or images, sonic or ultrasonic transmissions, near-field communication or other radio-frequency communications, and/or wired connections. The smart watch 110 may receive data from a computer network, such as the Internet, through the connection with the phone 105, or other nearby computing device (e.g., a laptop computer, tablet computer, desktop computer, or wearable computing device). In addition, or as an alternative, the smart watch 110 may access a network directly, for example, to communicate with server systems without the information being passed to and from the network through the phone 105.

Although the examples of FIG. 1A-1C and those discussed below refer to a watch, the same techniques may be used to with any other appropriate wearable device. For example, the functions performed by watch 110 may additionally or alternatively be performed by other "smart" devices having processing and communications capabilities, for example, a device in the form of glasses, a necklace, a ring, a bracelet, an armband, a belt, a shoe, and other wearable devices and apparel.

In some implementations, an application for user credential management is downloaded and installed at the user's smart watch 110 ("watch 110"). An application for credential management can also be downloaded and installed at the phone 105. The watch 110 and the phone 105 interact to enhance the user's ability to use credentials issued to the user, and to authenticate the user to secure systems.

In the example of FIG. 1A, the watch 110 and the phone 105 are paired, so that the two devices trust each other and establish a two-way communication link. The communication link can secured, e.g., encrypted, password protected, hidden or non-broadcasted, or otherwise configured to discourage interception. As a result of the pairing, notifications from the phone 105 are directed to the user's watch 110. The pairing may be exclusive, so that at a given time, the phone 105 is paired with a single watch 110, and the watch 110 is paired with a single phone 105. As a result, notifications from the phone 105 are designated for the particular watch 110, and not to other watches or other wearable devices that the phone 105 may communicate with. Similarly, the pairing may configure the watch 110 to communicate exclusively with the phone 105, at least during a particular communication session or until a new pairing is made. Alternatively, devices may be paired in a non-exclusive manner, so that each device may communicate with multiple other devices, for example, with any compatible devices within communication range. Pairing may be done by the operating systems of the watch 110 and phone 105, or by the credential applications downloaded to the devices, or by other means.

Push notifications can be forwarded from the phone 105 to the watch 110 in any of various ways. For example, the operating system of the phone 105 may push notifications to the watch 110 when the phone 105 is in communication with the watch 110 and the screen of the phone 105 is off. Alternatively, notifications may be selectively forwarded, or forwarded based on a determination by the credential application on the phone 105. For example, push notifications received by or generated by the credential application of the phone 105 may be evaluated to determine whether the notification should be forwarded. Notifications may be provided only if certain criteria or conditions are determined to have been met. Thus, the credential management application of the phone 105 may determine to forward messages to the watch 110 independent of the general forwarding settings of the operating system of the phone 105, in some instances.

When the user desires to authenticate to a secured resource, for example, to sign in to a web page, a server system communicates with the phone 105 to begin the authentication process. The server system may provide a code or other representation of a credential to the phone 105, or may indicate that the phone 105 should generate an appropriate code. The phone 105 then pushes a notification to the watch 110, which displays the notification and allows the user to complete the authentication process by interacting with the watch 110. As a result, the user is not required to take out the phone 105, enter a password for the phone 105, and perform other steps to perform the authentication. In particular, when the user is typing at a keyboard, the notification may be visible while the user's wrists are still over the keyboard, allowing the user to quickly see and interact with the notification without moving his hands away from the keyboard.

In some instances, the notification includes a representation of a credential, such as a numeric code, an optical code (e.g., QR code or bar code) or other information that serves as an authentication token. By presenting the information in the notification, e.g., by entering the numeric code or by allowing an optical code to be scanned by a camera, the user demonstrates his authorization, and that he is in possession of the phone 105 and watch 110 associated with the notification. The web server or other device provides the received code to the credential management server, which compares the code with the code that the credential management server sent or caused to be generated at the phone 105. If the received code matches the reference code the credential management server knows to be valid, then the user is authenticated. If the received code does not match the reference code, the user is denied access to the secured resource.

In some instances, the user interacts directly with the watch to complete authentication, rather than entering information from the watch 110 to another system. For example, after the user has established that the watch 110 is in the possession of a particular authorized user, subsequent authentication processes may prompt the user to tap an on-screen button displayed on the watch to authorize access. With a single tap or other gesture at the watch 110, the user can confirm that authentication should proceed, without the user manually entering a code to another device. When the user taps the confirmation control, the input is transmitted from the watch 110 to the phone 105, and from the phone 105 to the credential management server, which determines that the access should be granted in response. This technique can be used when the user has demonstrated possession of the watch 110. For example, if the user has recently authenticated using the watch within a specified period of time, such as 5 minutes, 30 minutes, 2 hours, the streamlined authentication process of confirming authentication with a tap may be used. Similarly, the streamlined authentication process may be used when, or only when, the watch 110 remains on the user's wrist for a continuous period after completing a different authentication procedure.

The watch 110 and/or phone 105 may monitor sensor data from the watch 110 to determine if the watch has remained on the user's wrist since authentication. Data from accelerometer sensors, skin contact sensors, and/or heartbeat detection sensors, can indicate whether the watch 110 has left the user's wrist since authentication. For example, accelerometer data showing complete stillness for at least a minimum amount of time may indicate that the watch is not being worn. A change in capacitance or resistance at a skin-contacting surface of the watch may indicate that the watch has been removed. The interruption of a heartbeat pattern may also indicate that the watch has been removed. While the watch is worn continuously after authentication, it can be inferred that the user possessing the watch is the same user that authenticated previously. Thus, a lower-security, less-intrusive authentication measure may be used. After an interruption in wearing the watch, however, the full authentication procedure may be required.

The watch 110 can be configured to display a watch face 107 user interface that includes interactive access controls 109a, 109b. These access controls may permit a user to tap to apply a credential, e.g., to transmit a request for access using the current authenticated state as authorization. Alternatively, the access controls may allow a user to tap to cause the watch 110 to output a representation of a credential locally at the watch 110. Other figures, including 4A to 4K show other interfaces that may be shown on the watch 110, and actions that can cause transitions between those interfaces. In general, the interfaces in 4A to 4K are primarily interfaces of an application or credential management functionality invoked by the user 102, and not necessarily a watch face or "home" screen for the watch 110.

In some implementations, the watch face 107 can be customized for use with the credential management system, and software causing the watch face 107 to be displayed may be installed on the watch 110. The watch face 107 can be shown as a "home" screen, or as an initial view when the user wakes up the watch 110. In some instances, the watch face 107, or at least portions including access controls, may be displayed or be active only when the user has authenticated to the watch 110, e.g., by entering the passcode for the watch 110 or a biometric identifier.

The custom watch face 107 can provide a direct way to initiate access to certain credentials or resources, along with an indication of the current time or other information. For example, the watch face interface may include a static button 109a that a user can tap to initiate access to a particular resource. A user may desire convenient access to his garage, for example, and so the watch face 107 may include, each time the watch face 107 is shown, a button that a user can tap to cause the garage door to be opened or closed. Thus, the user 102 does not need to perform multiple interactions to initiate access. Similarly, the watch face may include an access control 109b, such as a button, that a user can tap to bring up a representation of a particular credential, e.g., a passcode, an optical machine-readable code such as a QR code, a phrase, and so on that demonstrates possession of or authority to use a specific credential. This representation may encode data that is verifiable by a third party or the credential management server 130 to prove that the user has valid authorization. For a given user credential the valid representation may change over time, and so selecting the button may cause the watch 110 to generate a current representation based in part on the current time, or to request and receive a current representation of the credential from the phone 105 or the credential management server 130.

As another example, the watch face 107 may include an interactive button, or may respond to a certain type of interaction (e.g., swipe, long press, etc.), to bring up a credential interface allowing the user to select from among multiple credentials issued to the user or multiple resources associated with the user.

The access controls 109a, 109b on the watch face may be added in response to user input that designates the particular resource to be represented on the watch face with a persistent access button. For example, the watch 110 or another device can receive user input designating, e.g., a garage door, as a resource to have a persistent access button on the watch face 107, and the watch 110 may update the watch face interface accordingly. A user may "pin" or designate a particular access button to the watch face 107, where it may remain for multiple user sessions until the user 102 "unpins" or affirmatively removes it. Alternatively, the watch 110 or another device, such as the phone 105 or credential management server 130, may select access controls to be included for one or more credentials or resources automatically. For example, a default set of access controls may be provided.

In addition, or as an alternative, the watch 110, phone, 105, or credential management server 130 may instruct that the access controls shown on the watch face 107 change over time, e.g., according to a history or pattern of accesses by the user 102. The watch 110 or other device can determine which credential or resource was accessed most recently, and include a corresponding access control in the watch face 107 as a result. As another example, the watch 110 or other device can determine one or more most frequently accessed resources or credentials over a period of time (e.g., a day, a week, or a month), and may update the watch face 107 from time to time to show access controls for the most frequently accessed resources or credentials during the previous period.

Further, access controls shown on the watch face may be placed in response to context of the watch 110. For example, if the watch 110 or the phone 105 detects that it is in proximity to the user's garage door, and the user has a credential to be able to open that door, the watch 110 may dynamically update the watch face 110 to include a button for opening the garage door in response to determining the proximity. Alternatively, a different interface allowing access to the garage door may be provided instead of the watch face when proximity is detected. As another example, the pattern of accesses of the user may be used to vary which access controls are indicated on the watch face 107 or another watch interface. For example, if the watch 110, phone 105, or credential management server 130 determines that the user has a pattern of accessing the garage door between 7:00 am and 9:00 am and between 5:00 pm and 7:00 pm, the watch 110 may update the watch face 107 to show the garage door access control 109a during those times. The watch 110 may remove the control 109a when outside the times corresponding to the user's pattern, and may instead show a more relevant or generally applicable access control. Thus, based on access history for the user 102, location of the user 102 and proximity to different resources, and other information, the access controls shown on a watch face 107, or access controls on any interface of the watch 110, may be dynamically populated and varied. Of course, some access controls, such as those designated by the user 102 may remain constant, while others are changed by the system.

In some implementations, use of one or more access controls 109a, 109b is limited to situations where the watch 110 is in proximity to the resource to be accessed. Proximity can be enforced in any of a variety of ways. For example, the resource may provide a short-lived code using a short-range communication technology to the user's phone 105 or watch 110. The phone 105 or watch 110 can provide the code with the request for access to prove proximity. As another example, the phone 105 or watch 110 may send an access request to the resource over a short-range communication link, demonstrating proximity, and the resource may validate the credential information in the request or forward the request to the credential management server 130 for validation.

The level of authentication provided by a wearable device can vary, based on contextual factors such as time, location, and nearby devices. For example, the authentication level or confidence in correct authentication due to a watch may diminish with time. The phone 105 or credential management system 130 may receive data indicating a time that the user 102 most recently authenticated using the watch 110, or a duration since that authentication occurred. The longer the amount of time that is determined to have passed since that authentication, the lower the level of access that may be granted based on the presence of the watch 110, even if it has been worn continuously. For example, if the use authenticated just 5 minutes ago, then the prior authentication may be given a high level of trust, e.g., treated as if the user is newly entering the needed authentication input. However, the system may discount the level of trust or authentication represented by the watch 110. For example, after an hour user confirmation may be required for an action requiring authentication, rather than performing the action automatically. As another example, after two hours, a secondary form of authentication may be required, such as the presence of the user's phone 105 or entry of a code. After a maximum threshold, e.g., 8 hours, 12 hours, or 24 hours, the authentication may be considered to have expired, even if the watch 110 has been continuously worn since the earlier authentication.

The watch 110 can communicate with the credential management server 130, either directly through a network or indirectly by passing messages through the phone 105. This allows the watch 110 to provide information about its state, e.g., whether it is unlocked, or whether it has been continuously worn and for how long, or to provide logs or alerts about actions and detected environmental factors. This allows the credential management server 130 to receive periodic updates about the status of the watch 110, e.g., whether the watch is in an authenticated state. In addition, or as an alternative, the phone 105 or credential management server 130 can query the watch 110 to obtain state information, or the watch 110 can provide status messages when the status changes (e.g., each time the watch is locked or unlocked).

In some implementations, the phone 105 reports its latest status to the server 130, either periodically, on-demand, or the phone's status changes. The phone 105 can thus report whether the watch is in communication with the phone 105, whether the watch 110 is being worn, whether the watch 110 is unlocked, etc. as part of sending the status of the phone 105. This allows the server 130 to determine whether to allow streamlined user authentication using the watch 110 or not. The server 130 can send instructions to the phone 105 that direct a specific set of authentication actions, e.g., whether the phone 105 should pass an authentication message to the watch 110 or not. This may be provided in a "silent" notification that causes the phone 105 to perform processing without activating the screen or any other alert on the phone. The phone 105, when receiving an authentication request from the server 105 or another device, may determine whether the authentication request specifies that a connected wearable device such as the watch 110 should be sent a message or display an interface for completing authentication. The phone 105 can then determine to communicate with the watch according to those instructions, or based on other analysis that the phone 105 performs.

In some implementations, continuous wearing of the watch 110 can be a proxy for authentication actions other than simply entering a passcode to the watch 110. For example, when the user 102 enters biometric identifiers, either to the watch 110 or to another device that is detected to be within a threshold distance of the watch 110, continuous wear of the watch can maintain the biometric authentication. Thus, presence of the watch 110, worn continuously, may be considered a proxy for biometric authentication actions all through the day. Similarly, in a high security facility, authentication may be required to be witnessed and approved by a human proctor. If the watch 110 is worn at the time the proctored authentication occurs, the proctored authentication can be considered valid as long as the watch 110 is continuously worn. Different requirements can be applied for different credentials managed using the credential management system, for different resources accessed, and for different access actions using a given resource. In some implementations, the watch 110, phone 105, and/or credential management server 130 may use heart rate data, heartbeat data, and/or motion signature data generated by the watch 110 to assign an authentication level, either to determine whether the watch 110 has been continuously worn, or as an additional verification. The credential management server 130 can use machine learning to determine the data patterns associated with individual user, and then the credential management server 130, the phone 105, or the watch 110 can compare current data patterns with the signatures determined for the user to verify whether the current heart rate, heart beat pattern, and movement pattern match the reference pattern within a threshold range. The more the current user behavior pattern determined from the watch 110 sensor data differs from reference patterns, or when a combination of behavior data is identified as anomalous through machine learning techniques, additional security measures can be required. This may involve requiring additional authentication actions, disallowing an attempted access of a resource, or disabling or revoking a credential.

Figure 1B:
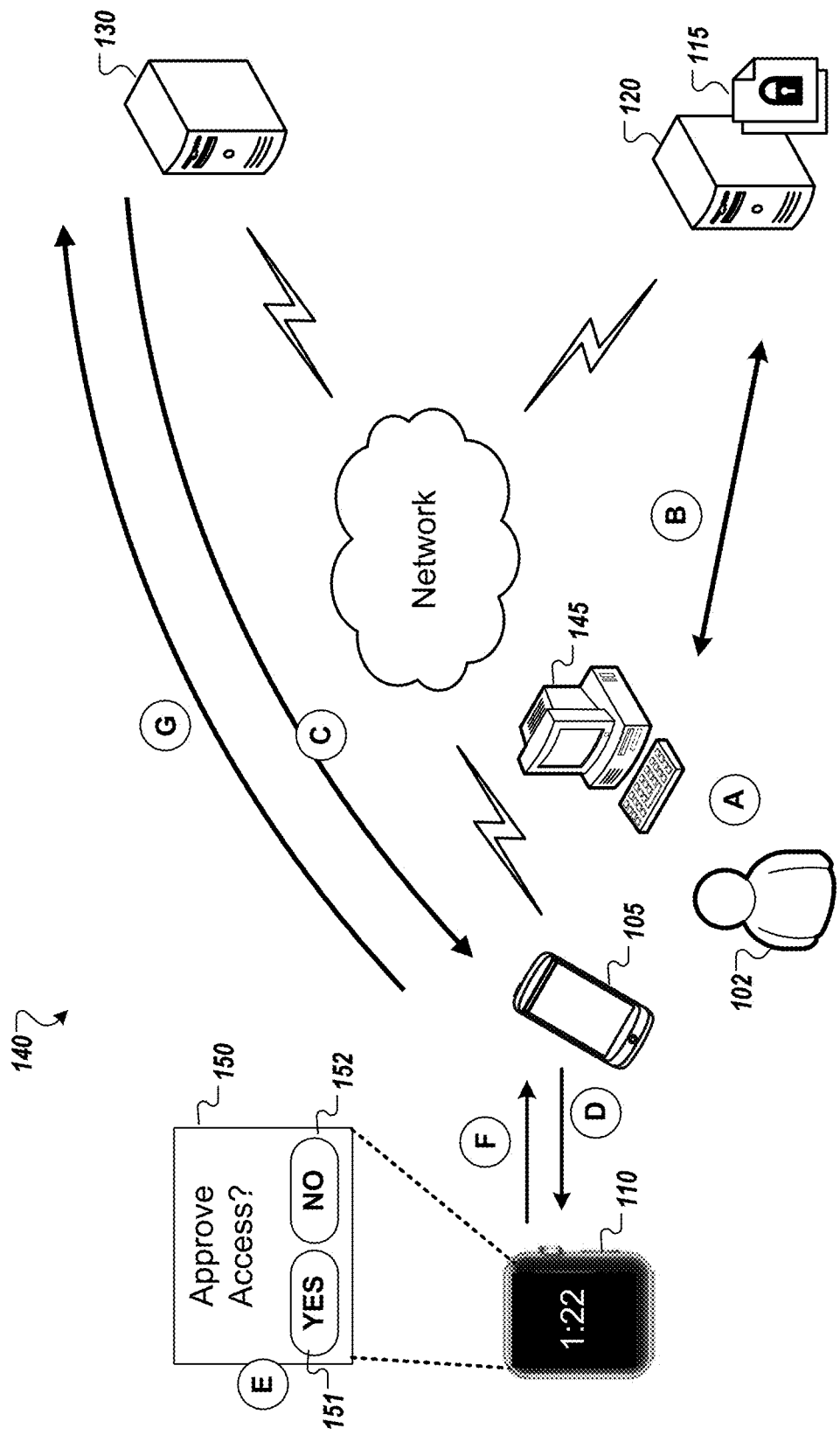

FIG. 1B illustrates examples of interactions that can be used to authenticate a user and gain access using a wearable device. The figure shows a system 140 including elements from the system 100, and including a resource device 145, shown as a computer. In the example, the user 102 accesses the resource device 145, and the watch 105 and phone 105 cooperate with the credential management server 130 to authenticate the user to a secured resource 115, such as a website.

In addition to the type of access illustrated, the same technique may be used to obtain access to any appropriate secured resource, whether logical or physical. For example, the resource accessed could be a door, and the authentication process could be initiated when a user device, e.g., the phone 105, or a wearable device, e.g., the watch 110, known to be associated with the user is detected in proximity to the door. Similarly, the same technique could be used to unlock a computer In stage (A), the user 102 interacts with the resource device 145 to navigate to or otherwise request access to the secured resource 115. In stage (B), the resource device 145 communicates with the server 120 to initiate a new session. The server 120 redirects the resource device 145 to the credential management server 130, e.g., for authentication through a single sign-on (SSO) service provided by the credential management server 130. In stage (C), the credential management server 130 sends an authentication request to a user device, e.g., the phone 105. While the phone 105 could provide output to the user and be used to complete the authentication, it may not be convenient for the user to do so. The phone 105 determines whether an appropriate wearable device, e.g., watch 110, is in proximity to the phone 105. The wearable device may be required to have previously been registered with a user account for the user 102, or to have been paired (e.g., via Bluetooth or another communication link) or associated with the phone 105 previously, to be considered an appropriate device. In stage (D), having determined that the watch 110 meets the necessary criteria for use in authentication, including proximity to the phone 105, the phone sends a notification to the watch 110. This notification may be sent directly, e.g., over a short-range communication link like Bluetooth.

In stage (E), the watch 110 receives the notification and provides an output to the user. For example, the watch 110 provides the notification on a screen. As shown, the watch 110 can provide a user interface 150 that includes controls 151, 152 that the user can select to approve or deny the authentication. In the example, the presence of the watch 110 associated with the user, and potentially the continuous wearing of the watch 110 since a prior authentication of the user 102, are sufficient to verify the user's identity. The user 102 is given the opportunity to confirm or deny the access, thus verifying that the user 102 (e.g., rather than an imposter who does not possess the watch 110) intended to obtain access. The user 102 can confirm the authentication with a single interaction, e.g., a single tap on the touchscreen to approve the authentication. If an unlocked state of the watch 110 or continuous wear of the watch 110 since the last authentication were not present, the user 102 can be given the opportunity to authenticate, e.g., by entering the device unlock code for the watch 110, entering a biometric identifier (e.g., providing a voice sample, scanning a fingerprint, capturing a face or eye image) at the watch 110 or the electronic device 110.

The requirement for user input to the watch 110 can be optional. For example, depending on the security requirements of the access being requested, no user input may be required. For example, the phone 105 can determine what level of security is required for the authentication request, and provide a notification requiring input only when required to meet the determined level of security. When no user confirmation or input is needed, e.g., when the phone 105 determines that an unlocked or authenticated and continuously worn watch 110 is sufficient, the phone 105 may simply send a query for watch status or context information as the notification. Thus, the watch 110 respond that it has been continuously worn since authentication, and no output to the user 102 is required. In some implementations, some processing can be deferred to the watch 110. For example, the phone 105 may indicate the security level required for the authentication. The watch 110 may determine whether that security level has been achieved, and only output to the user 102 an interactive interface for confirmation or other data entry when the watch 110 determines that the required security level has not been achieved.

In the example, the phone 105 does not output any notification of the authentication request to the user 102, the interface of the watch 110 is used instead. Thus, from the user's perspective, the phone 110 does not appear to "wake up" from its low power state during the process. The screen of the phone 105 may remain dark and the user 102 does not need to remove the phone 105 from his pocket. At the same time, the phone 105 handles network communications and various determinations, taking advantage of the phone's greater battery capacity, processing capacity, and network interface capability compared to the watch 110.

In stage (F), the watch 110 sends data indicating the user's indicated approval of the authentication to the phone 110. The watch 110 may send data indicating the user selection, as well as information about the context of the watch 110. This context information, e.g., sensor data or device state information, can confirm that the authentication is sufficient and provide data used for logging or reporting purposed. In stage (G), the phone 110 indicates to the credential management server 130 that authentication should proceed. As a result, the credential management server 130 completes the new authenticated session for the user 102 with the resource 115, and communicates with the resource device 145 and/or server 120 to establish access to the session.

While the example of FIG. 1B shows access to a web site, access to other resources may be gained in the same manner. For example, a file, a folder, an application, a VPN, a network, or other resource may be accessed in the same manner. Similarly, a device itself may be unlocked or accessed using the same technique. For example, rather than accessing a website using the resource device 145, the resource device 145 may be unlocked. For example, a device may detect proximity of the phone 105 or watch 110 and may issue an authentication request or may communicate with the credential management server 130 so the server 130 sends the request.

Also, while the authentication request in the example of FIG. 1B shows an output to the user 102 and input by the user 102 to the watch 110, various implementations are configured to perform authentication without requiring input from the user. For example, if it is not desired to require confirmation from the user, the output and interaction of FIG. 1B may be omitted, and the watch 110 may automatically send data sufficient to approve the request. For example, when the watch 110 is determined to have been worn continuously since the user authenticated to the watch 110 (e.g., by entering an unlock code, biometric input, or other authentication data), the presence of the watch may be considered as an effective replacement for authentication using a passcode. The watch may be considered to provide continuous authentication as long as it is worn without interruption, or is worn within a defined set of parameters. Thus, rather than sending data indicating user interaction, the watch 110 can send data confirming its status, e.g., that the watch has been worn continuously since the user 102 authenticated, and this may be sufficient to complete the authentication and grant access without displaying a user interface or requiring user confirmation.

Figure 1C:
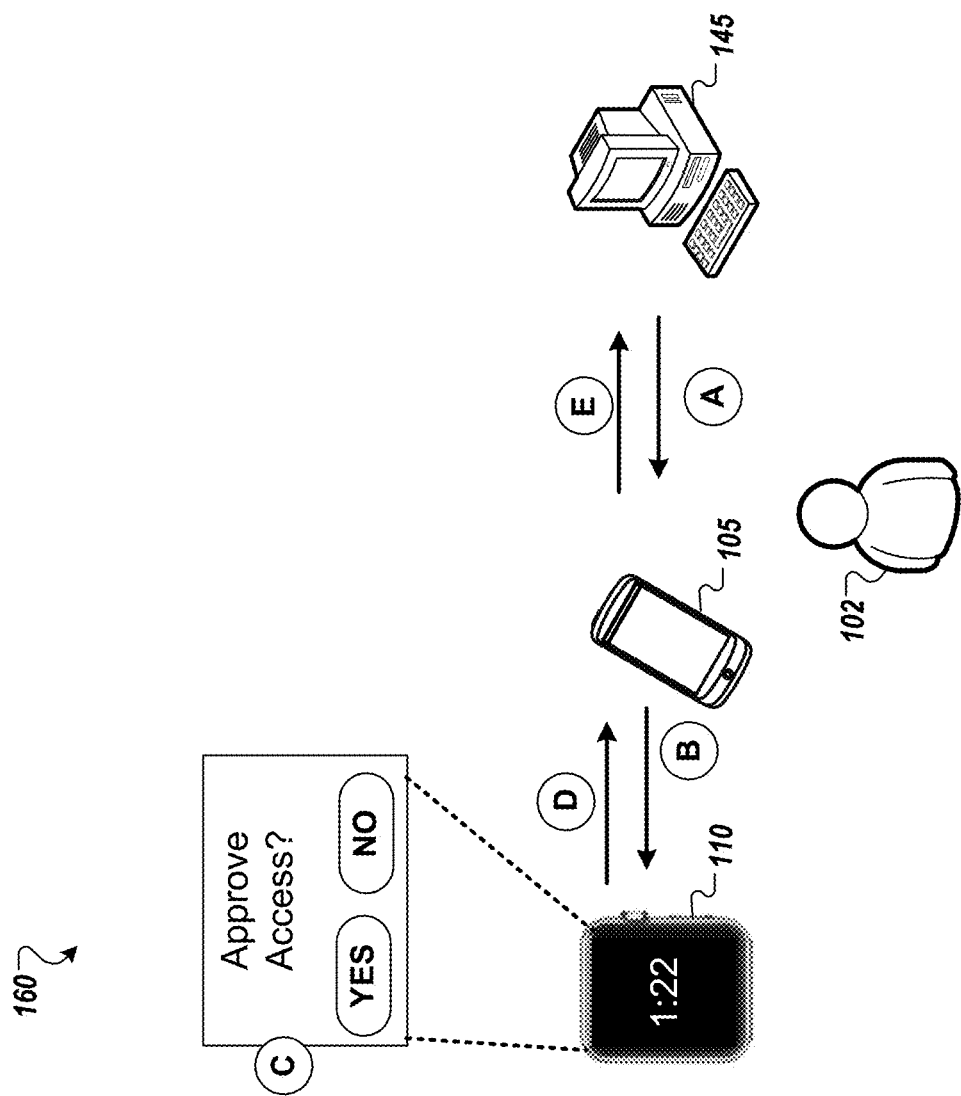

FIG. 1C shows another example of interactions that can use a wearable device for credential management. In the example, authentication and access are determined using local or direct connections between the devices, without communication with a credential management server 130 over a network.

In stage (A), the user device, e.g., phone 105, receives an authentication request from the resource device 145. The request may be sent in response to detecting proximity between the phone and the resource device 145, due to a short-range communication link between the devices. In stage (B), the phone 105 sends a notification to a wearable device, e.g., the watch 110, associated with the user 102. In stage (C), the watch 110 displays the notification. In the example, the watch 110 provides a user interface allowing the user to approve or deny access. However, the display of the output and receipt of a user selection is optional. If the watch 110 has been worn continuously after authentication by the user 102, then the watch 110 may simply provide information indicating this, and no user input or alert to the user may be needed.

In stage (D), the watch 110 provides data indicating its state, and/or data indicating user input received after showing the user interface. In stage (E), the phone 105 responds to the authentication request indicating that authentication should proceed. The phone 105 may provide a code or identifier stored or generated by the phone 105 to provide that the phone 105 is authorized to access the resource device 145. For example, the phone 105 may provide a representation of a credential, as discussed below, or code based on an encryption key used to pair the phone 105 and resource 145 together. The data provided to the resource device 145 may include a password or other data that log in or unlock the resource device 145. The resource device receives the data from the phone 105, determines that it is valid and sufficient to gain access, and provides access in response.

Figure 2:
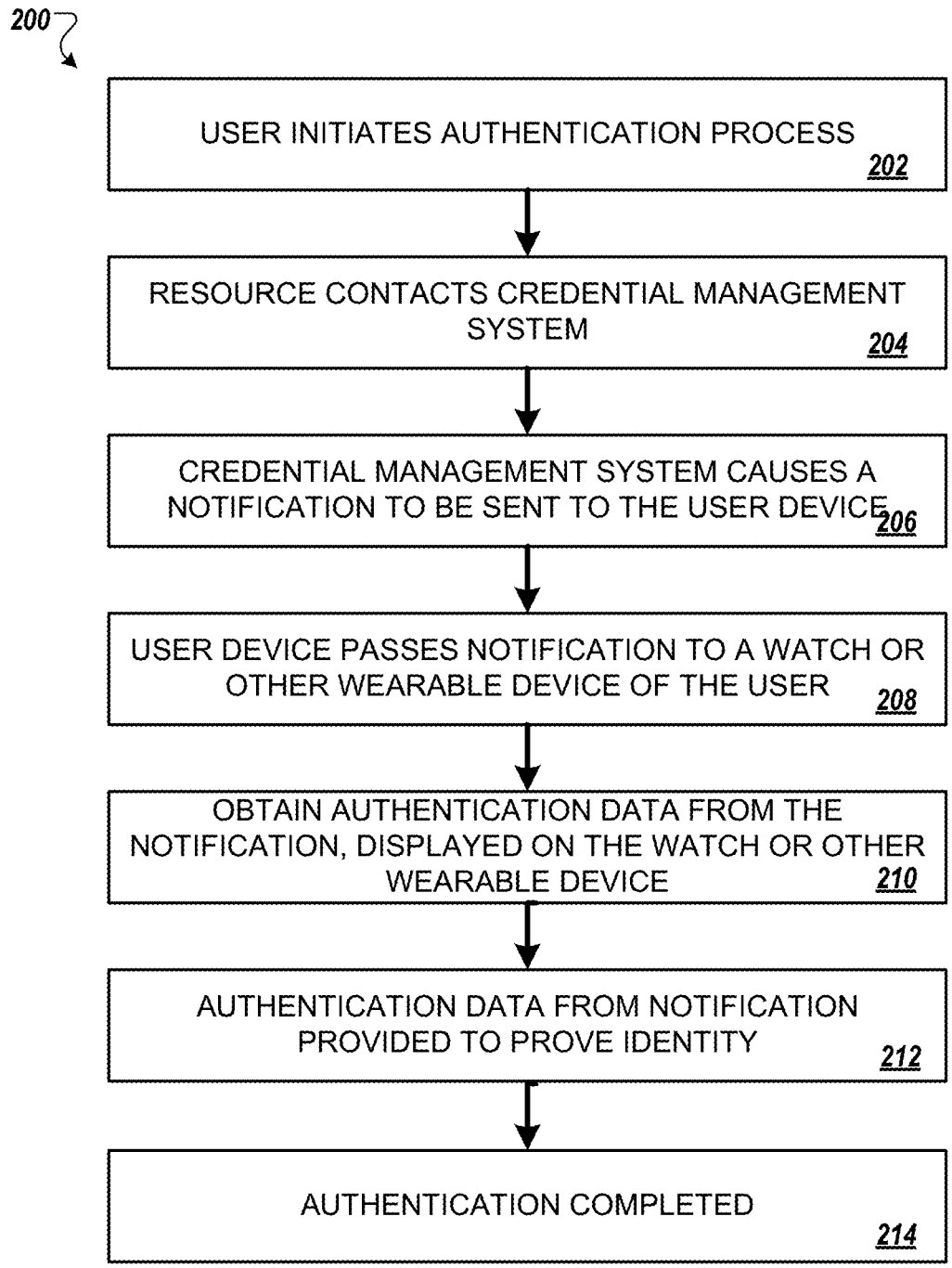
FIGS. 2 and 3A-3C are flow diagrams that illustrate examples of processes for using a watch of other wearable device for user authentication.

FIG. 2 illustrates an example of using a watch of other wearable device for user authentication. In the example, a user initiates an authentication process, such as a log-in at a web site (202). In response, a web server contacts the credential management server providing single-sign-on (SSO) functionality (204). The credential management server communicates with the credential application of the phone 105, causing a notification to be generated at the phone 105 (206). The phone 105 pushes the notification to the watch 110 (208). The watch 110 displays the notification, which can include means to verify the user (210). The means to verify the user's identity can be, for example, a numeric code, optical code such as a QR code, or other data that can be used to verify that the user is authorized to use the credential. The user then uses the notification to verify his identity and his authorization to access the secured resource (212). For example, the user may enter the code received through the watch interface to the computer where the user is signing in, so that the credential management system can compare the provided code to a reference and verify that the code proves the user's identity, and that authentication can be completed (214).

Figure 3A:
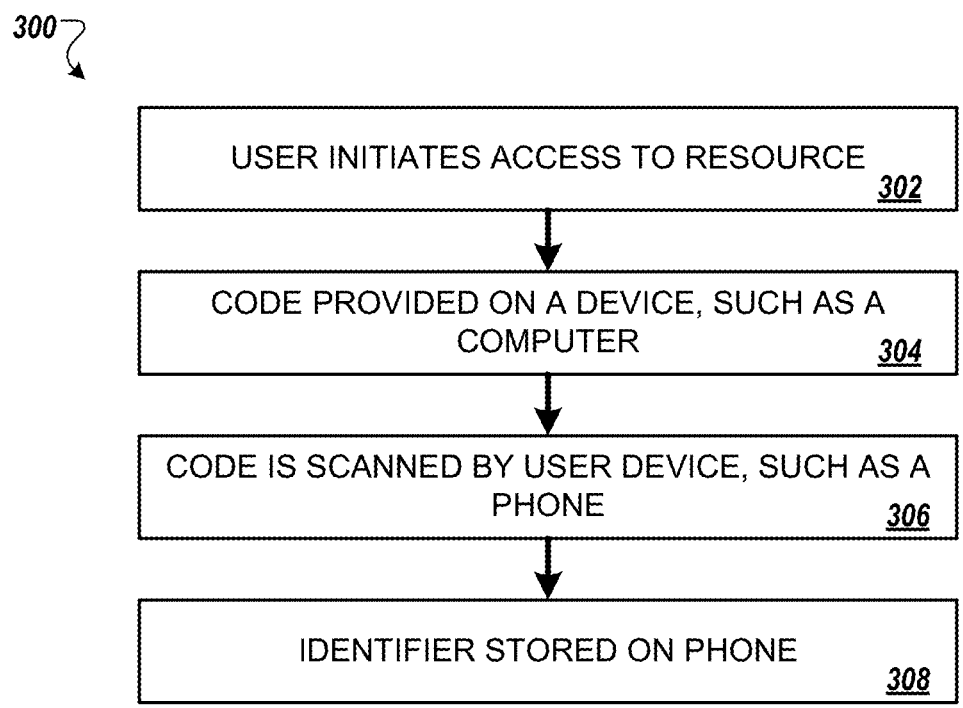
Figure 3B:
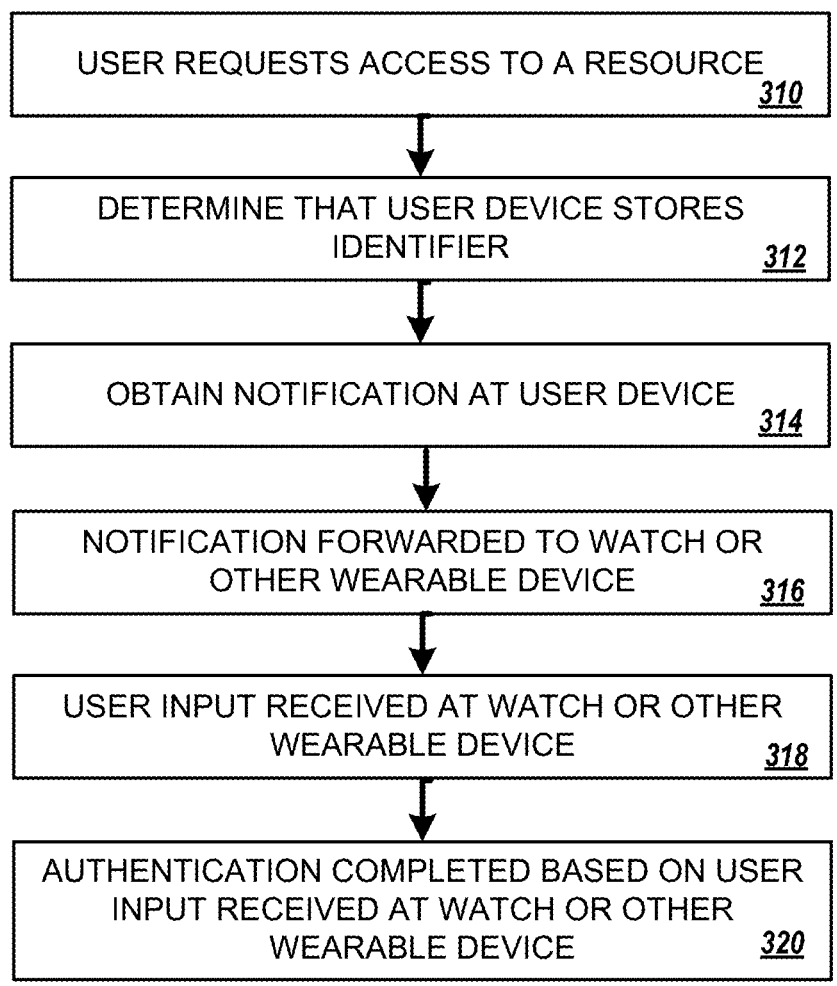

FIGS. 3A and 3B illustrates another example of a process for using a watch or other wearable device to authenticate a user. In FIG. 3A, the user initiates access or authentication to a secured resource, such as a web page (302). As part of the authentication process, the web page provides an optical machine-readable code, such as a QR code or other code, on a display (304). For example, a QR code may be provided by an authentication server, or by the web page after authentication is complete. The user scans the code using a camera of the user device, e.g., phone 105 (306). The credential application on the user device stores an identifier on the user device (308). For example, the identifier can be a value derived from the scanned optical code, or may be a badge object, certificate, or other data representing a credential of the user.

In FIG. 3B, for a subsequent authentication for the resource, the user is able to use the wearable device for a streamlined authentication procedure. The user initiates access to the secured resource (310). The credential management server obtains the stored identifier (which was placed as discussed in FIG. 3A) from the user device, and determines that the user device has a valid identifier representing prior authentication using the user device (312). In response, credential management server determine to use a streamlined authentication process is used. The credential management server sends a push notification to the phone (314). The phone forwards the notification to the wearable device, e.g., watch 110 (316). The user interacts with the notification on the wearable device, for example, with a tap to approve login rather than interacting with the user device (318). Thereafter, data indicating the user input from the wearable device is forwarded to the user device, then to the credential management server which verifies that authentication is appropriate and informs the web site provider so that authentication is complete (320).

Figure 3C:
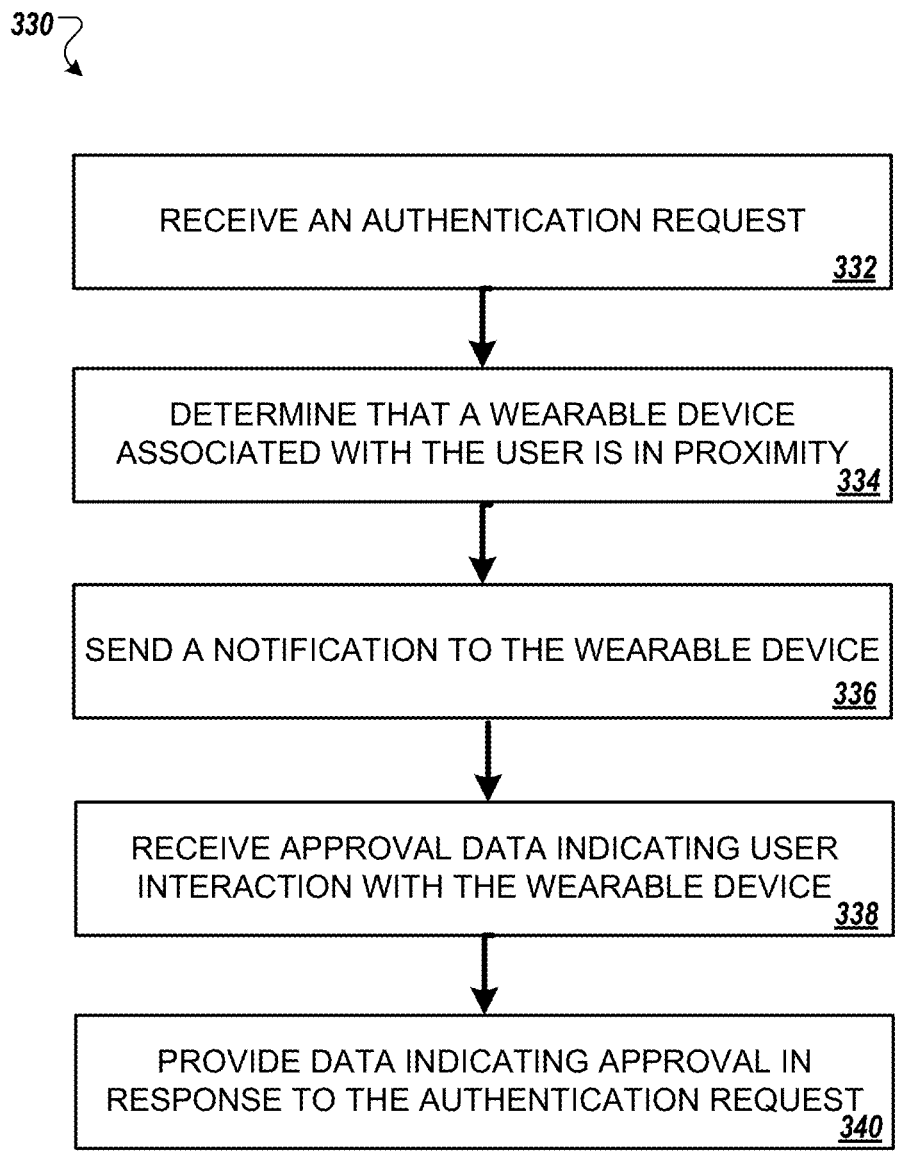

FIG. 3C is a flowchart illustrating an example of a process 330 for authentication using a wearable device. The process 330 can be performed by an electronic device, for example, a user device such as a second wearable device, a mobile phone, a laptop computer, a desktop computer, a tablet computer, etc. Before the process 330, the electronic device and the wearable device may be associated with the user. For example, the electronic device and/or the wearable device may be registered with a user account. The electronic device and/or the wearable device may have a credential management application installed, and the user may log in to the credential management application or otherwise set up the application to access one or more credentials issued to the user. The user may have a login and/or password to access the electronic device and/or the wearable device, such as a passcode required by an operating system to unlock the user's phone and the user's watch. While the credential management application can manage these credentials in some implementations, the credential management application can additionally or alternatively manage access to other credentials. Examples of these other credentials include an employee badge issued by an employer, a credential to access a parking garage or a building, a driver's license, a library card, The wearable device may be associated with the user or the user account for the user prior to the process 330. For example, the wearable device may be paired with the electronic device or otherwise registered as a trusted device. Pairing between the electronic device and the wearable device may occur using Bluetooth, or another communication link. The wearable device may be designated as an authentication factor for the user. For example, after a user registers his watch with his user account in the credential management system, that watch can be considered as trusted for use in authentication processes. If certain conditions are met, such as the watch being worn continuously since the user unlocked the watch, then the watch may be considered to be a secure token. The presence of the authenticated and continuously worn watch may be accepted in lieu of other authentication actions that would otherwise be required.

Even if the watch is not authenticated and continuously worn, for example, if the watch is in a locked state or if the watch was removed after the most recent authentication, the registered watch can be used to provide the authentication interface for the user. For example, messages sent to the user's phone, which would otherwise require the user to take out the phone to view, can be forwarded to the watch for display. Similarly, for tasks that would require the user to interact with the phone, the phone can trigger the display of an interactive interface at the watch so the user can complete the action solely by interacting with the watch. For example, if a passcode is required, it may be much more convenient for the user to enter the passcode to the watch, whether by tapping buttons or by voice input, than it would be to perform the same input to a phone that may not be as near. For a user typing at a keyboard or otherwise using his hands, it is much quicker and easier to read a notification on a watch than to take a phone out of a pocket. Similarly, a user that is typing can move a hand from the keyboard to interact with a watch face on the other wrist with minimal movement, much more easily than taking out a phone and performing the same interaction.

Referring to FIG. 3C, an authentication request for a user is received at the electronic device (332). For example, when a user attempts to access another device, such as a computer or an electronic lock, or a logical resource, such as a secured file, folder, website, VPN, network, or application, the authentication request may be generated and sent to the phone. The request may be sent directly from a resource device to the electronic device, for example, over a short-range wireless communication link such as Bluetooth, or by an optical data connection. The request may be sent from a server over a network. For example, when a user navigates to a website that uses a single sign-on (SSO) system, the web site may communicate with a server system, and the server system may send the authentication request to the electronic device over a network. In some instances, the authentication request may be triggered automatically, for example, by the electronic device or the wearable device coming into proximity of a resource device. The resource, or an application of the electronic device, may generate the authentication request upon detecting the proximity.

Various types of authentication requests can be used. The request may specify one of multiple different security levels that each have different authentication requirements. The request may not specify a security level, but may be associated with a credential or policy that the electronic device uses to determine which security level and which corresponding authentication actions are needed. As discussed below, the electronic device may acquire and analyze context data representing the environment of the electronic device to perform these determinations.

The electronic device determines that a wearable device previously associated with the user is in proximity to the electronic device (334). Proximity of the wearable device to the electronic device can be determined based on a direct wireless communication link being present between the devices. For example, at least a minimum signal strength between the devices on a radio-frequency link, such as Bluetooth, may be indicative of proximity. The wearable device may be a watch, a wristband, a necklace, an article of clothing, glasses, or other wearable device.

The electronic device can determine the identity of the wearable device, e.g., that a specific device having a certain device identifier is present, or that the device has been registered with a user account for the user. In some implementations, this may involve determining that the user has previously authenticated to the wearable device, e.g., with a device unlock code or other input.

The electronic device can determine that the wearable device has been continuously worn since the user authenticated to the wearable device, e.g., by entering the wearable device's unlock code after putting on the wearable device. The electronic device may determine that the wearable device has been continuously worn based on skin sensor data or heartbeat data from the wearable device. For example, a resistive sensor, a capacitive sensor, and/or a light sensor on a wearable device, e.g., on the back of watch, can detect whether the device has remained in proximity to the user's skin. Motion patterns of the wearable device, or heartbeat data measured from a sensor of the wearable device can also be used to determine whether the device has been worn continuously. The threshold for a device being "continuously worn" can be set as appropriate, e.g., to accommodate the level of accuracy of the available sensors and needed security level of a given use. In some implementations, no measurable interruption may be tolerated. In some implementations, a device may be considered continuously worn if maintained on a user with a lapse in measurement or contact of, e.g., no more than e.g., 1 second, three seconds, etc. In some implementations, the wearable device determines whether it has been work continuously, and indicates to the electronic device whether the device has been worn continuously since the last authentication.

In response to determining that the wearable device associated with the user is in proximity to the electronic device, the electronic device sends a notification to the wearable device for output by the wearable device (336). In some implementations, the electronic device may require various factors in order to provide the notification to the wearable device rather than output the notification at the electronic device. For example, the electronic device may require one or more of a specific level of proximity, prior registration with the user account for the user, presence of a particular application running on the wearable device, a certain device status of the wearable device (e.g., on and unlocked), and so on.

The electronic device can forward some or all of the information in the authentication request to the wearable device, with reformatting and adjustment as needed. In some implementations, a notification that would otherwise be output at the phone is forwarded to the wearable device to be output, e.g., displayed or played audibly, by the wearable device. In some implementations, the wearable device is a watch, and the notification causes the watch to output the notification on a display of the watch. The display can be a touchscreen display, allowing the user to provide touch input to interact with the notification or associated controls displayed in response to the notification.

The notification may cause the wearable device to provide an interactive interface. For example, the notification can cause the wearable device to display an interactive approval control to approve the authentication with a single interaction of the user. Alternatively, it may prompt the wearable device to provide other information (such as sensor data or information indicating the state or context of the wearable device) automatically, without manual input to the user.

The wearable device may have its own passcode or other input required to authenticate the user to the wearable device, e.g., to unlock or log in the user. If the wearable device is unlocked when the notification is sent, the wearable device may provide the interactive interface directly, for example, providing a button that the user may simply tap to confirm that the authentication process should proceed. If the wearable device is locked, the wearable device may require the user to enter the device unlocking code, enter a biometric input, or otherwise authenticate before confirmation will be provided back to the electronic device. For example, the user may be required to enter the unlock code before or after tapping to indicate that the authentication should proceed.

In some implementations, at least some actions may not require the wearable device to be unlocked. For example, for low security authentications, the presence of the watch registered to the user may be sufficient, even if currently locked, and an interface allowing the user to confirm authentication with a single tap may be provided regardless whether the wearable device is locked or unlocked.

The electronic device receives approval data indicating user interaction with the wearable device approving authentication in response to the notification (338). The approval data may indicate, for example, that the user interacted with an approval control displayed on the touchscreen of the watch in response to the notification. In some implementations, the electronic device also receives state data or context data for the wearable device, allowing the electronic device to verify that conditions for authentication are still valid. For example, the wearable device can send sensor data indicative of whether the device has been worn continuously since the last authentication of the user.

The electronic device provides data indicating approval of the authentication request in response to receiving the approval data from the wearable device (340). If the authentication request was from a server, e.g., a credential management server, the indication of approval can be sent back to the server. If the authentication request was from a local device, such as a computer or door lock in communication over a short-range communication link, the electronic device can send the approval confirmation directly over that link. The data indicating approval can cause the receiving device to complete the authentication process and provide access to the requested resource corresponding to the authentication request. For example, a door that the user attempted to open may be unlocked, the user's car may start, the user's security system may accept a command provided to it, or the user may be granted access to a logical resource such as a file, a folder, a VPN, or a network.

The electronic device may perform a number of verifications at various steps of the process. For example, the electronic device may determine a security level corresponding to the authentication request. For example, some authentication requests may permit a watch to be used during the authentication process, and some may not. An authentication request may be linked to a specific credential issued to the user, and the credential may have policies that govern the parameters for using the credential. For example, a credential policy may restrict the time periods and/or locations at which the credential may be used, or may indicate that a stricter level of authentication is required for certain times and/or locations. The electronic device may gather context data, such as GPS position, time of day, state of the electronic device and/or wearable device, and so on and use this information to determine what level of authentication is required and what actions the user needs to perform to complete the authentication. Thus, depending on whether certain conditions in the credential policy are met, the use of the wearable device may vary. For an action that a policy classifies as a low security action or a low risk situation, a previously authenticated and continuously worn wearable device present may be sufficient to grant authentication with no user input. For a medium security action or situation, a previously authenticated and continuously worn watch may be sufficient for authentication if the user interacts with the watch to approve, e.g., by tapping a button confirming that approval should proceed. For high security, the user may be required to enter a code to the watch, or may be disallowed from using the watch and may be required to interact with the user's phone or other device.

In some implementations, the presence of the authenticated and previously worn watch can reduce the overall amount of input required from the user. For example, to make authentication automatic, e.g., with no explicit user input required, when confirmation was needed before. Or, it may be used to allow mere confirmation instead of the entry of a device unlock code or other passcode that would otherwise be required.

As discussed above, the authentication request may be linked to a particular credential issued to the user. This may be a credential different from the unlock codes or user accounts for the operating systems of the electronic device and wearable device. Instead the particular credential associated with the authentication request can be a credential for a user in a single-sign on service, or an employee's credential from his employer, etc. The electronic device may identify the credential associated with a request, and obtain data indicating the corresponding policy for the credential, e.g., from local storage or by requesting the policy from a server system. Having determined the applicable policy, the electronic device may carry out the requirements of the policy in the authentication process. For example, the policy may indicate that an additional authentication factor is required when one or more conditions occur. As a result, the electronic device may provide, to the wearable device, a notification requesting user input for the second authentication factor. After providing the notification, user input for the second authentication factor, such as a code or biometric identifier may be received at the electronic device from the wearable device. The additional data for the second authentication factor may then be provided to a server system.

In some implementations, the policy indicates that an additional authentication factor is required when one or more conditions occur. The one or more conditions may limit, for example, a time or location the credential can be used without the additional authentication factor. The electronic device can determine that the one or more conditions of the policy associated with the credential have not occurred, based on context information as necessary. Providing the data indicating approval of the authentication request may be performed in response to determining that the one or more conditions of the policy associated with the credential have not occurred.

In some implementations, a credential policy comprises a reporting policy indicating items of data to log or provide to another system. The electronic device can identify which information is needed, according to the reporting policy, collect the data and transmit it to the server system or electronic address indicated by the policy. That information may include data that indicates, e.g., geolocation, beacons detected, device state, application context (e.g., which are installed, or which are open or active), movement levels or patterns, or authentication history.

When a credential is linked to the authentication request, e.g., indicated by or required by the request, the electronic device may condition proceeding with the authentication on whether the credential is valid. The electronic device can determine whether the particular user credential is valid, and either send the notification or provide data indicating the approval in response to determining that the user credential corresponding to the association is valid.

The electronic device can be configured to output an alert in response to receiving authentication requests when a wearable device is not in proximity. Rather than outputting an alert, when the wearable device is detected, the electronic device can suppress the alert. The notification can be sent to the wearable device instead of outputting the alert. Thus, there may be no discernable output by the electronic device (e.g., audible, visual, and/or haptic outputs may be suppressed), and the user may interact entirely with the wearable device to complete the authentication, even though the authentication approval is ultimately sent by the electronic device.

In some implementations, the electronic device sends a notification that requires an authentication action, such as entry of a code at the wearable device to permit authentication. For example, the electronic device can determine that the wearable device is locked or has not been worn continuously since a most recent authentication of the user to the wearable device. In response, the electronic device can send data to the wearable device requesting that the user authenticate to the wearable device. The electronic device can receive, from the wearable device, data indicating that the user authenticated to the wearable device. The electronic device can indicate approval of the authentication request as a result of this authentication to the wearable device.

Referring again to FIG. 1A, in some implementations, possession of a watch 110 may be used as an authentication factor for access to a secured resource. For example, a specific watch 110 may be pre-associated with a specific user, so that possession of that watch 110 is indicative of user identity. Possession of the watch may be one factor in a multi-factor authentication system. One way that the user can demonstrate possession is through user interaction with the watch. When the user's phone receives a notification or request for confirmation of identity, the phone forwards the notification to the watch. The user approves access using the watch. In some instances the user may input a code, voice sample or other biometric input, or other authenticating data at the watch as part of demonstrating possession of the watch. As discussed above, in some instances, the user may obtain data from the user interface of the watch, such as a code displayed on the watch, that can be provided to another device to prove possession of the watch. Possession of the watch may be determined by communication with the watch, for example, direct communication with the watch to obtain an identifier stored at the watch.

Similarly, wireless communication with the watch 110, using a communication protocol having a having a geographically limited range, and demonstrate possession of the watch within the limited range. For example, a geofenced area may be designated using location Bluetooth stations or beacons. When the watch 110 is able to receive location signals from specific Bluetooth stations, the watch 110 may be determined to be within a particular distance of the Bluetooth stations.

The watch 110 may be used as an authentication factor to access any of a variety of secured resources, including logical resources, such as logging in to a virtual private network (VPN), web page, or computer file, or physical resources, such as locks on doors and other physical items.

In addition to or instead of using possession of the watch as an authentication factor, data from the watch 110 may also be used as an authentication factor. Data from accelerometers and gyroscopic sensors may be collected over time as evidence of typical motion patterns when the watch is worn by a specific user. The data may then be used, by the watch 110, phone 105, or a server system, to determine a motion signature for the user that indicates the specific manner in which the user typically moves while wearing the watch 110. At the time of authentication, additional motion data may be captured and another motion signature generated. If the motion signature at the time of authentication matches the reference motion signature that has been created for the user, the similarity can be used as a factor in favor of authentication. Conversely, if the motion signature has less than a minimum similarity with the reference motion signature, heightened authentication standards may be required. Additional authentication factors may be required, or in some instances authentication may simply be denied.

In a similar manner, sensors from the watch 110 may monitor the pulse of the user over time and determine the typical characteristics or patterns of the user's heartbeat. A reference heartbeat signature may be generated and stored based on this data. When a user attempts to access a credential, the watch 110 can detect current heartbeat characteristics and generate a heartbeat signature for comparison with the reference heartbeat signature previously generated and associated with a particular user identity. Based on a comparison of the heartbeat signatures, similarity that meets or exceeds a minimum threshold can be determined to confirm the identity of the user to a degree. When similarity does not reach the minimum threshold, the comparison may fail to confirm identity, or in some instances may cause heightened security standards to be required.

The credential application on the watch may provide any of various different user interfaces. As an example, the watch 110 may provide notifications that are pushed to the watch 110 based on the context of the watch 110 and/or the phone 105 associated with the watch 110. The user can be alerted, on the user interface of the watch 110, to the opportunity to use a particular credential as the opportunity arises. For example, as a user approaches a secured parking garage entrance, the proximity of the user's phone or watch to the entrance is detected. One of the user's devices or a server system can determine that the user possesses a credential that is capable of opening the gate to the entrance. In response, a notification is pushed to the phone 105, and forwarded to the watch 110 to alert the user of the ability to apply the credential to open the gate. Further, the notification can be interactive, allowing the user to select a control on the watch to apply the user's credential and open the gate directly from the notification interface.

In another example, the credential application of the watch 110 may provide a "glance" view that a user can launch manually. This view can show the locations of nearby resources that the user has credentials to access. For example, based on the user's location and the set of credentials possessed by the user, the doors or other resources within a certain distance of the user may be identified. The glance view can show the locations of those door, for example, using a map, arrows, a list, or other user interface elements to show the user the nearby areas that his keys can access.

In another example, the credential application for the watch 110 can have an interface that allows the user to view each of the keys that the user has been issued, and permits the user to select a key and use it to gain access to the corresponding resource. This user interface may identify each of the keys that a user has authorization to use. The user interface may also permit the user to activate a user-selected key from among the set to gain access to the corresponding resource.

Information from the watch 110 can be used to carry out continuous authentication. In some implementations, this represents that authentication remains valid on a continuing basis as long as certain conditions regarding the watch 110 are satisfied. For example, when the watch 110 provides access to the heartbeat sensor and wrist detection APIs, a security framework can provide ongoing or continuing authentication to systems.

As an example, a user can be asked to prove three different forms of authentication, such a secret (e.g., a password), a token (e.g., possession of a phone, watch, or other device designated as a token for the user), and a biometric characteristic (e.g., a fingerprint, voiceprint, face image, etc.). After successfully authenticating using these factors, the credential management system can consider the authentication valid as long as (i) the watch is worn (e.g., without interruption, or without any interruption exceeding a maximum time period) and (ii) a heartbeat pattern detected by the watch matches a previously-enrolled heartbeat pattern for the specific user. While these conditions are detected, the credential management system may consider an expanded set of other authentication techniques acceptable for confirming or authenticating subsequent accesses, including access to different resources or credentials than were originally authenticated. That is, compared to the authentication requirements when the watch is not worn and the initial multi-factor authentication test, while the watch is confirmed to remain with the authenticated user, an expanded range of authentication options, and less-intrusive or time-consuming authentication methods, may be accepted. This can permit secure and convenient authentication to multiple different systems, including the use of simple confirmation user inputs provided to the watch 110. Even for systems that typically require multi-factor authentication, the validity of the initial multi-factor authentication can be maintained (e.g., applied to satisfy future subsequence authentication attempts) as long as the wrist presence and heartbeat pattern conditions are satisfied. Once the system detects that the watch 110 is disconnected from the user's wrist, or cannot confirm that the required conditions are present, use of the expanded range of authentication options is disallowed. For example, subsequent authentication to a system that requires multi-factor authentication would require input and verification of each of the required factors, and the prior successful authentication is not applied toward the new identity challenge.

As another example of continuous authentication, for enhanced security, different forms and levels of authentication can be required at different time periods, combined with continuous monitoring of watch presence and/or heartbeat pattern in between. A rigorous authentication, for example, using multi-factor and/or biometric authentication requirement, may be required periodically at particular intervals. The validity of these authentications may be required to be enhanced through a requirement for continued heartbeat monitoring between authentications. The watch 110 may broadcast ongoing heartbeat data to a monitoring system, which can verify that heartbeat or watch presence is not interrupted. Similarly, a requirement for tracking geographic location, either in between authentications, during authentications, or both, on a periodic or continuous basis, may also be required. Location may be determined, for example, using global positioning system (GPS) data and/or more fine-grained micro-location using location Bluetooth stations As another example of continuous authentication, an authentication system can form a continuous, real-time link to a user. In many typical authentication scenarios, authentication is effectively stateless, where each authentication is often not affected by prior authentications or conditions prior to an authentication attempt. In a system with a real-time, continuous link with the user, wearing the watch may be a condition for authentication. For example, to initialize a session, it may not be sufficient to prove the required forms of multi-factor authentication alone, the user may be required to additionally be required to wear the watch during the authenticated session, or the session will be terminated. If the watch presence sensor or heartbeat sensor indicate that the watch is not present, the system may log the user out and consider the session expired.

In some implementations, data from sensors in a watch can be used as variables in multifactor authentication. Sensor data provided from the watch, combined with sensory input from the phone can be used as variables in multifactor authentication and risk scoring algorithms. These algorithms can assess data from the watch sensors along with other information about the behavior of the user to determine whether an authentication attempt presents an above average or below-average risk. Factors considered can include patterns of time, location, access frequency, access duration, proximity of others. For example, if the user typically wears the watch when authenticating, but the watch is not present during one authentication attempt for the user account, the deviation from standard patterns may be detected and used to require additional identity verification factors.

In some implementations, the glance view of the credential application for the watch can provide other information besides nearby contextual objects such as areas that user's credentials provide access to. For example, when the user initiates the glance view and there are no contextual objects located within a threshold distance, the glance view can provide metrics about the user's usage activities such as physical, and logical access activities and weekly usage trends.

Other variations of the glance view include features that permit characteristics of contextual objects to be controlled or modified by users. For example, users may be able to specify which categories of contextual objects should be displayed, and how they should appear. The display may be adjusted based on location, time, resource type, which credential or organization is associated with the object, and so on. Users may be able to cause different objects, individually or in groups, to be shown or hidden, according to user-specified criteria. Contextual objects can also be displayed in various different ways. A user may be able to designate a favorite object, such as a frequently used door or elevator. Frequently used objects or user-designated objects may color-coded or otherwise visually distinguished from other objects in the glance view.

In some implementations, a control or indicator on the watch user interface can allow a user to switch from a hierarchical navigation, such as a series of nested menus, to a simple list, such as a list of badges that the user can swipe across to scroll through the list.

In some implementations, the watch and phone may grant and enforce permissions for sharing digital assets. For example a user may permit specific users to access the user's phone or watch, or may permit the user to transfer images, coupons, digital keys to other users. The watch may include user interface elements to initiate or confirm sharing, or to select content or recipients for the content.

In some implementations, the credential application for the watch has a user interface that indicates nearby users of the same application. For example, the user interface may display people in clusters of different colors, based on the organization's network badge color. The user will be able to drill down to the see the individuals on each organization and down to the actual user badge information (e.g., profile photo, name, title, etc.). From this interface, the user may add a discovered person to his contact list, send a message to the person, invite the person to a new network, add the person to a list of favorites, or add a note to a user profile for the person.

In some implementations, the credential application can provide reminders based on proximity to other users. The user will be able request to be notified when he is in proximity of a specific user, e.g., within 20 feet, within 10 feet, etc. The notification can be configured to have a custom message (e.g. "Ask John about the status of last week sales," "This week is Jane's birthday," etc.). The user will get a discreet notification on his Watch the next time he's in proximity of that user. Proximity between users can be determined in a variety of ways, for example, due to short-range wireless interaction between the devices of two users, or by a server system that tracks locations of each individual user, using GPS, location Bluetooth stations, or other techniques.

In some implementations, the credential application for the watch will enable a user to initiate or approve transactions using voice commands. For example, the user can approach a garage gate, bring the watch close to his face and says "Usher, open garage." As another example, a user can receive a request to approve a transaction, using a voice command she can approve it, deny it, or ask for more information. For example, the user receives the notification "Purchase Order from Jane for $400, new watch for testing." By just speaking close to the watch and saying "Denied," the transaction will be revoked.

In some implementations, the credential application can be used for package delivery confirmation. The delivery person and addressee will each have a badge or credential within the credential management system. The delivery person will be able to confirm the addressee's identity by using the credential application on his watch. The information about the addressee's identity may be conveyed directly between the watches using Bluetooth or near-field communication. The addressee's photo, name, and address will be shown on the delivery person's watch. Once the package is in the addressee's hands, the delivery person will mark the package as delivered. At this point, a notification will be sent to the addressee asking for his delivery confirmation, and the addressee can confirm that delivery occurred using the watch or phone. Having this two-step confirmation, along with the same geolocation presence in the same time slot will serve as proof of delivery.

FIGS. 4A-4K show examples of user interfaces for smart watches or other wearable electronic devices.

Figure 4A:
FIGS. 4A-4K are diagrams showing examples of user interfaces for smart watches or other wearable electronic devices.

In FIG. 4A, the user interface 1.1 shows a "context-pushed" view that appears on the watch in response to proximity to a contextual object. A device in communication with the watch, such as the user's phone, can detect a nearby door, lock, vehicle, or other object nearby and provide the notification automatically without the user providing any input to the phone or watch. In some instances, a server system or even the phone itself may determine that a nearby contextual object is present, and that one of the user's credentials can perform an action for the object. The interface indicates the object "HQ P3 Garage," the credential type, "key," and provides an interactive element to perform an action, e.g., to apply the credential to open the garage gate by tapping the control labeled "open."

Also in FIG. 1A, the user interface 1.2 shows a "context pulled" interface that can appear in response to a user selection on the watch, such as a tap, a side button press, a swipe, or another gesture. This interface may permit the user to cycle or scroll through a list of several nearby objects for which the user's credentials permit various different actions to be performed. The view of a nearby contextual object may indicate the item and may include a control, e.g., the "open" button shown, that allows the user to apply a credential to perform an action with respect to the contextual object.

The user interface 1.3 in FIG. 4A shows another view that permits a user to see other sets of credentials, objects, and related actions. These items may not be limited to nearby objects, but may show, for example, recent actions taken, a set of all objects a particular credential can act on, or a set of all credentials or all objects that the user's credentials can be used with.

Figure 4B:
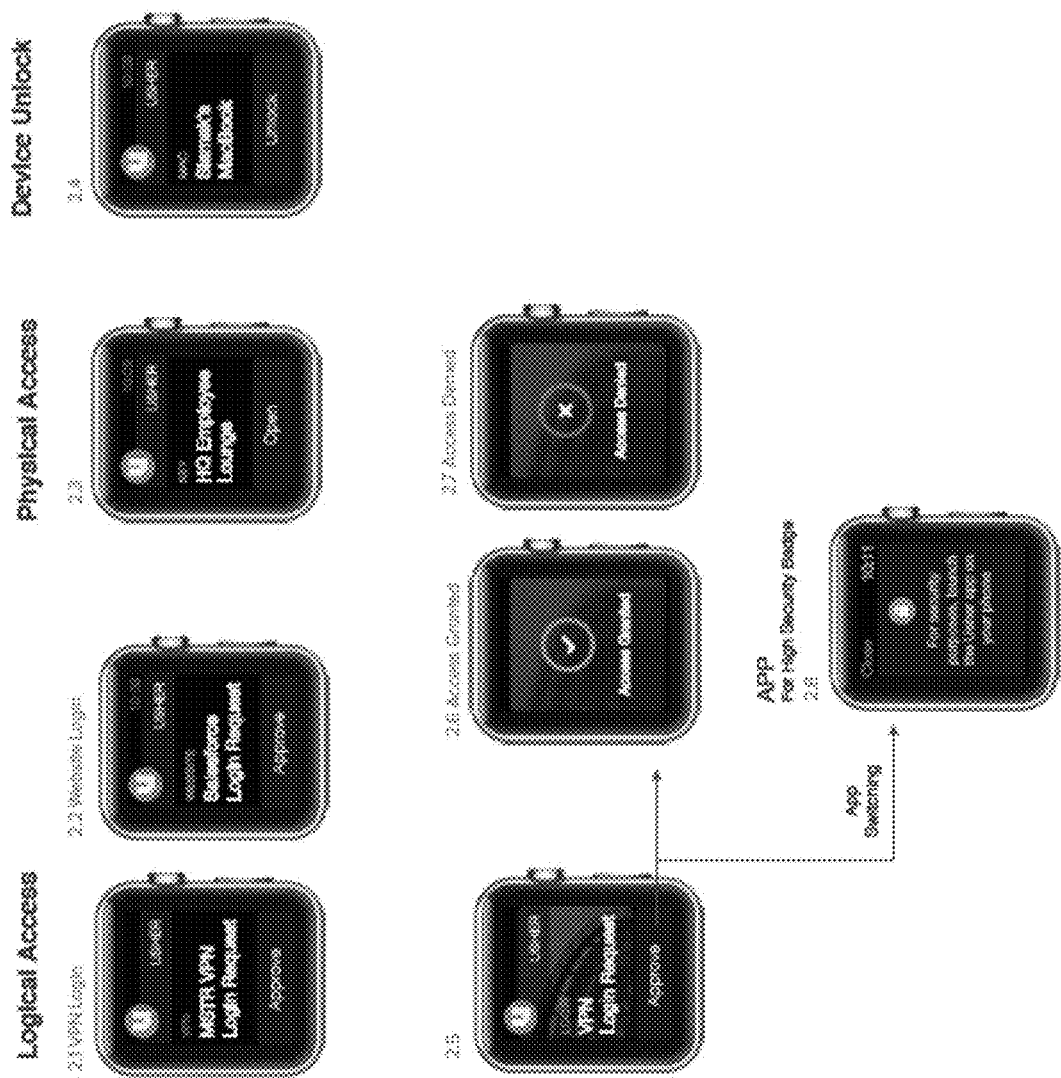

FIG. 4B shows various examples of context pushed user interfaces. Each can indicate the resource type (e.g., VPN, website, key, etc.) and/or the specific resource involved (e.g., Siamak's MacBook, Saleforce Login Request, etc.). Each interface may also include one or more interactive elements indicating actions the user can take by interacting with the element (e.g., open, unlock, approve, etc.).

Figure 4C:

FIG. 4C shows examples of context pulled "glance" user interfaces. These views can also identify a resource and or resource type, may indicate proximity (e.g., "nearby" or stating a particular distance or distance range), and include a control to perform an action by interacting with the watch user interface.

Figure 4D:
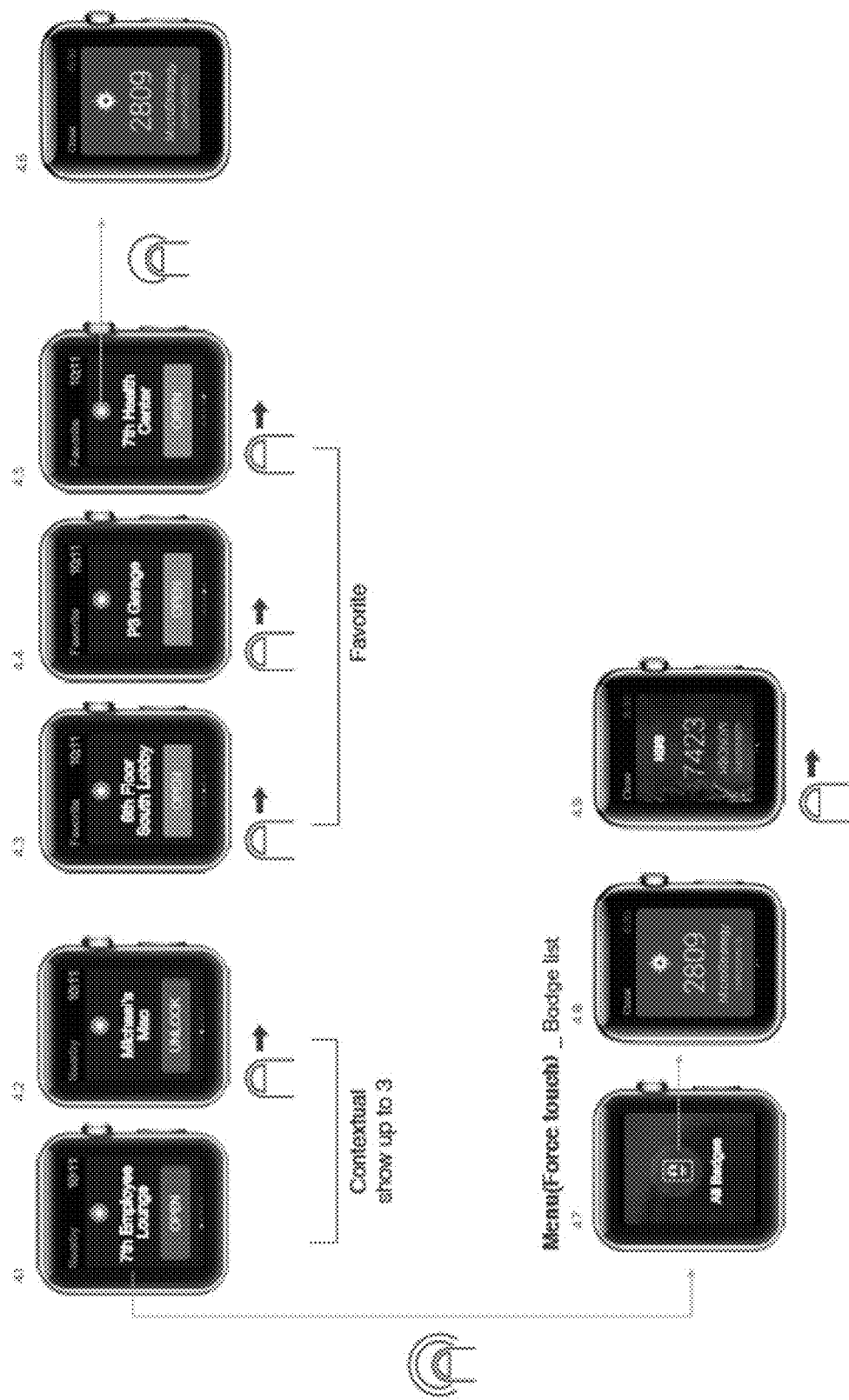

In FIG. 4D, interfaces 4.1 and 4.2 show that a user can scroll between different context pulled views with a swipe of the finger. Interfaces 4.3-4.5 show that a user can also scroll through various different resources and views to see resources that a user has designated as favorites. In some instances, when a user selects an element to apply a credential, the user is provided a representation of the user's credential which can be used to access the resource. In 4.6, the user is shown a 4-digit code in response to selecting to open a door, and the user can provide the code from the watch to access the resource. If a user taps or presses the watch for a normal duration when the watch screen is off, one of the interfaces of 4.1-4.5 can be shown. If the user presses and holds, referred to as a "force touch," the user can be shown different badges or representations of credentials, as shown in 4.7-4.9. Some or all of the badges shown may include codes or other information that allow the user to gain access to a resource.

Figure 4E:

In FIG. 4E, the interfaces 5.2-5.3 show different feedback to the user after attempting access to a resource from the interface 5.1. The interfaces 5.4-5.5 show that some keys, credentials, or resources may be grouped to a single watch interface (e.g., interface 5.4) or be represented by a single button. Once a user makes a selection, different options can be shown (e.g., interface 5.5). Different resources (e.g., lane 1 or lane 2), and different uses (e.g., enter or exit) of a resource can be shown, to permit a user to select more specifically what action is desired.

Figure 4F:

In FIG. 4F, the user can use interfaces 6.1-6.6 to designate favorite objects or keys. Interaction with the watch in interface 6.1 can open the credential application on the user's phone, showing a particular view (e.g., interface 6.2) for adding favorites. The user can select favorites on the phone, and those favorites are communicated to the credential application on the watch, so that the user can cycle through the favorites at the watch (e.g., interfaces 6.5-6.6).

Figure 4G:
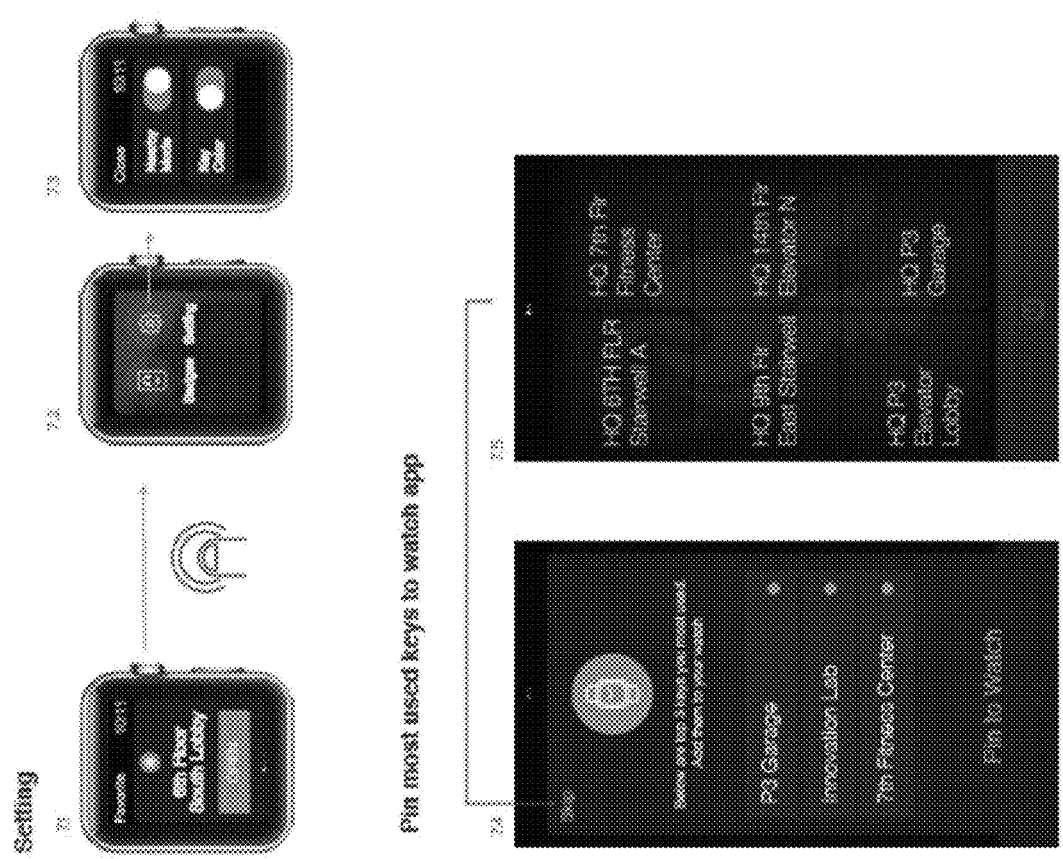

In FIG. 4G, the user can change various settings, such as setting colors of different electronic keys, setting different modes (e.g., to allow pushed notifications of contextual objects or not, or other modes), and so on.

Figure 4H:
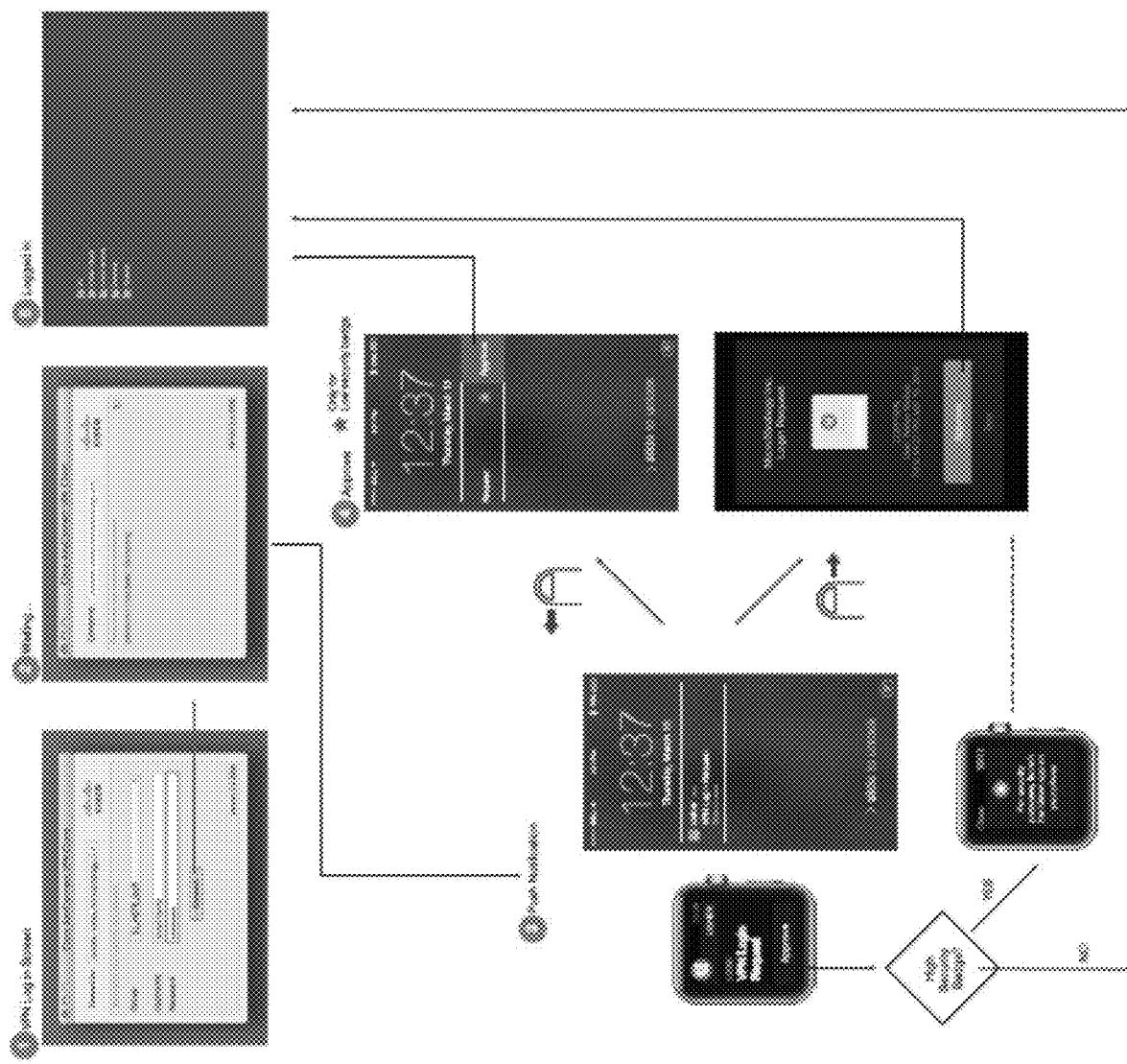

FIG. 4H shows an example of using the watch and phone to log into a VPN on computer. The user initiates the login at the computer in steps (1) and (2). This causes the credential management server to push a notification requesting approval to the user's phone (e.g., step (3)). The phone forwards the notification to the watch. The user may use either the phone or the watch to approve the log in. For example, if high-security is not required, interaction with the watch alone is sufficient to approve the login. If high-security is required, the user is instructed on the watch interface to use the phone to complete the process. The user can then approve on the phone (step (4)). For some badges, the user may be provided an interface element to approve the login at the initial unlock screen when the phone display is first activated. For credentials requiring higher security, the user may be required to log in to the phone, then approve in an interface of the credential management application of the phone. In this manner, different access actions can use the watch in different ways. The phone or other user device can determine, based on the type of action required, the resource for which access is attempted, the credential being used, and environmental or contextual factors whether to send an alert to the watch or whether to require authentication to occur through interaction with the phone.

Figure 4I:

FIG. 4I shows examples of different "glance" interfaces, which may be shown when a user interacts with the watch. In some implementations, these may be also provided in response to other triggers detected by the watch, the phone, or a credential management server. For example, the triggers may include physical proximity to an object, a reminder at a particular time, or other conditions.

Figure 4J:
Figure 4K:

FIG. 4J shows additional examples of watch interfaces. FIG. 4K shows that interfaces can show data, such as QR codes, that can be provided to other devices to prove authorization or identity of the user. These codes may be hidden until a user indicates approval to use the credential.

According to some implementations, representations of credentials for groups of users or for individual users may be generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from the credential management applications executed on client devices; and credentials can be represented in various forms as described below. For example, credentials can be represented by parametrically-generated graphical representations, animated graphical representations, phrases, numeric representations, and/or optical machine-readable representations (e.g., bar codes or QR codes). A server, or collection of servers, can manage and distribute credentials to appropriate users' client devices.

Different credentials may be issued by different credential issuing organizations. For example, a company may have an associated credential issuing organization issuing credentials for its employees that are used for accessing various company resources, whereas a physical fitness chain may have another associated credential issuing organization that issues credentials to its members for accessing the fitness centers managed by the chain. The credentials issued by different credential issuing organizations may be managed using the credential management system, which enables a first user of the credential management system to validate a credential presented by a second user of the credential management system irrespective of the credential issuing organization that issued the credential. Responsive to successful validation of a credential, information associated with the validated credential (including information about the credentialed second user) may be disseminated to the validating first user.

A credential management application may be installed on a client device through various suitable means. For example, a user may install the credential management application from an application store. In another example, the user may install the credential management application from a server through a web page or web interface.

The credential management application may enable a user to access one or more of the user's credentials from one or multiple client devices. To prevent fraudulent use of a user's credentials from a client device, the credential management application may require the user to authenticate their identity and register each of the user's client devices with a credential management server. The credential management server may issue a certificate to each of the user's client devices, such that the credential management server can recognize the client devices as having been registered with the user's account.

FIG. 5A shows an example of a user interface 150 that enables a user to login to a credential management application on a client device. In particular, when a user opens the credential management application on the client device, the client device presents login screen that includes a caption 152 stating "Welcome To Credential Management Application," an input box 152 for the user to enter an email address or username, and an input box 156 for the user to enter a password. After the user enters the user's email address (or username) and password, the user can select command button 158 to sign into their user account. In response, the client device transmits to a server a request for access to the user account, where the request includes the email address (or username) and password. The server then determines whether the email address (or username) and password are valid for a user account. If the email address (or username) and password are valid, the server determines whether the requesting client device has already been registered with the user account (e.g., by determining whether a valid certificate was included with the request). If not, then the application recognizes the device as a new device and displays the screen shown in FIG. 5B.

FIG. 5B shows an example user interface 200 of a credential management application for registering a new client device. The user interface 200 shows a message 206 prompting the user that "This is the first time you have used this device to login to your account. Please give a name to this device." The user can provide a name for the new device in input box 208. The user interface 200 also includes a cancel button 202 to return to the previous screen and a next button 204 to proceed with the new device registration by providing biometric identification.

Figures 5C, 5D:
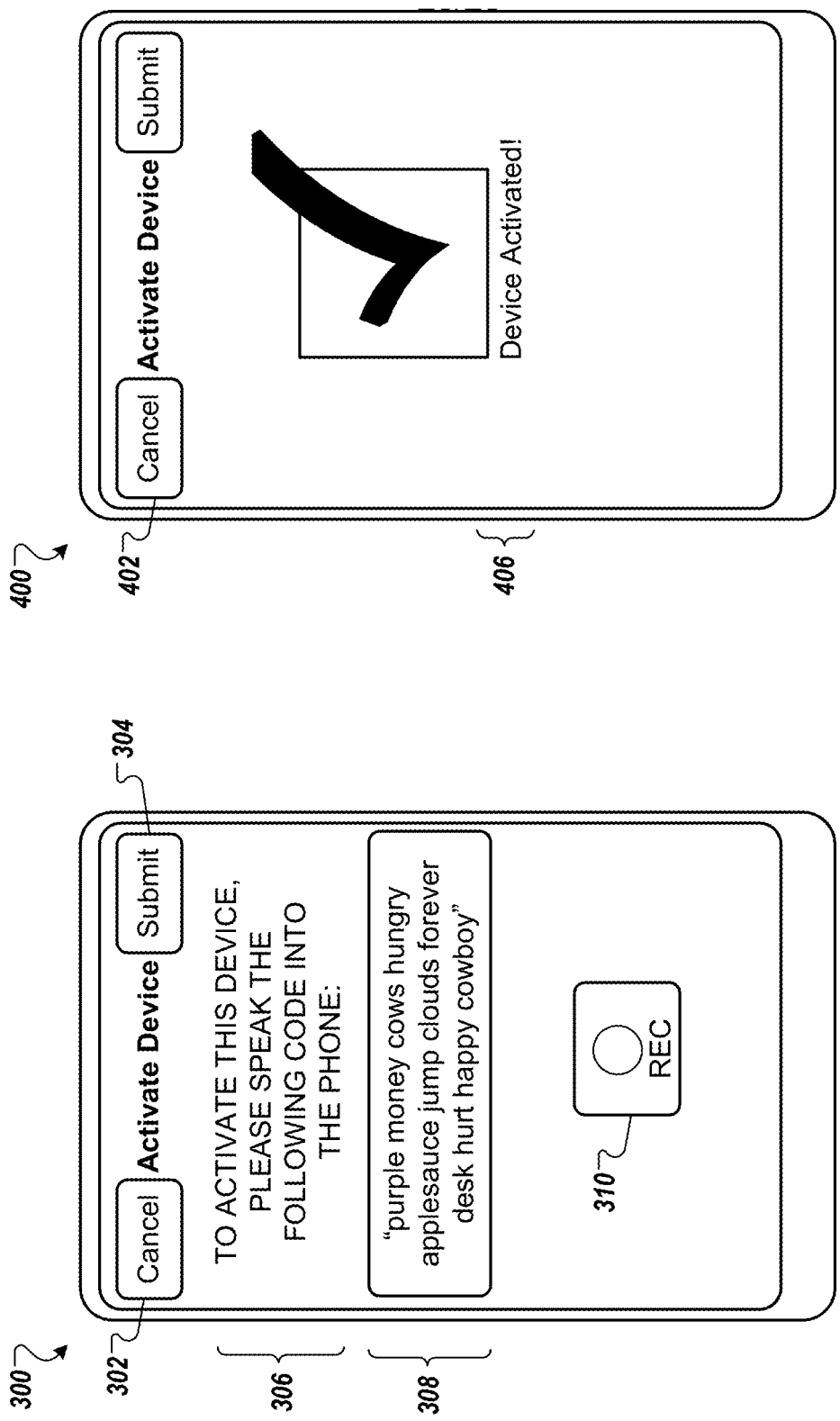
FIG. 5C is an illustration of an example of a user interface for biometric verification in a credential management application.
FIG. 5D is an illustration of an example of a client device activation screen.

FIG. 5C shows an example user interface 300 for biometric verification in a credential management application. The user interface 300 includes a message 306 prompting the user that "To activate this device, please speak the following code into the phone." The client device provides a phrase 308 "purple money cows hungry applesauce jump clouds forever desk hurt happy cowboy" that the user may utter into a microphone of the client device. The client device may obtain the phrase, for example, by generating the phrase or receiving the phrase from the server. To start and stop recording the utterance of the phrase, the user presses the record button 310. The user interface 300 also includes a cancel button 302 to return to the previous screen (e.g., as shown in FIG. 5B) and a submit button 304 to transmit the recorded utterance to the server.

FIG. 5D is an example of a client device activation screen 400. Assuming that the server authenticates the user (e.g., the submitted utterance matches a voice print associated with the user account), the server transmits a message to the client device indicating that the user was authenticated and the client device was registered with the user account. In some implementations, the message from the server includes a certificate that can be used by the client device for subsequently accessing the user's account. The application notifies the user that the client device has been successfully registered with the user account by providing a "Device Activated!" message 406. The screen 400 also includes a cancel button 402 to cancel the registration procedure, and a submit button 404 to continue to access the user's account (e.g., the user's wallet shown in FIG. 5E).

FIG. 5E shows an example user interface 500 that enables a user to select from among various credentials associated with the user. In particular, the user interface 500 includes an example of a user's wallet (identified with a "User Wallet" caption 502) that provides the user with access to numerous different credentials associated with the user. The credentials in the user's wallet illustrated in FIG. 5 may have been made accessible via (e.g., downloaded to) the user's wallet responsive to successfully authenticating the user and associating the client device with the user's account. For example, the user interface 500 includes an "App User Credential" 506, a "MicroStrategy Employee Badge" 508, a "MicroStrategy 10th Floor Access Badge" 510, and a "MicroStrategy Executive Suite Badge" 512. The user can select any one of these credentials from the user's wallet to output a representation of the credential from the user's client device. The user may make the selection, for example, by touching the corresponding area on a presence-sensitive display (e.g., a touchscreen) of the client device. The user can also select an Edit command button 504 to modify settings associated with the credentials, and can add a credential to the wallet by selecting command button 514.

While not shown in FIG. 5, credentials in the user's wallet may include credentials associated with memberships to department stores and/or gymnasiums, identity credentials (e.g., driver's licenses, passports, visas), health insurance cards, badges to gain entrance to a location or event, a ticket for entry to a location or event, a key that unlocks a lock (e.g., for entry to a location), etc. Each of the credentials in the user's wallet may also be associated with one or more keys. For example, the "MicroStrategy Employee Badge" 508 may be associated with one or more keys that provide access to various physical resources controlled by the organization associated with the credential (e.g., MicroStrategy). A user may select one of the displayed credentials 506, 508, 510, and 512 to access additional information, including any keys, associated with the selected credential. For example, after selecting the "MicroStrategy Employee Badge" 508, a user interface, including a list of five keys issued to the user by MicroStrategy, may be displayed on the client device. The user interface may be displayed in response to an input (e.g., sliding horizontally from left to right or right to left, or vertically up or down) while a credential 600 associated with the "MicroStrategy Employee Badge" 508 is displayed. The user may select one of the keys displayed in user interface to activate the selected key and access a corresponding physical resource. For instance, when the user selects the HQ 12th Lobby South key, a key to a door of HQ 12th Lobby South may be activated by a server of the mobile platform system.

FIG. 6 shows an example representation of a credential. For example, when a user selects the "MicroStrategy Employee Badge" 508 shown in FIG. 5, the selected badge 600 may be displayed on the client device as shown in FIG. 6. The badge 600 includes a caption 602 identifying it as an "Employee Badge" for "MicroStrategy Incorporated." Also included is an image of the user 604 and a caption 606 that identifies the associated user as "John Smith, Chief Operating Officer." The badge 600 further includes a swiping slider 608 that may enable a user to select between different representations for the credential. For example, in the current position, the slider 608 causes an optical-machine readable representation for the credential 610 (e.g., a quick response (QR) code) to be displayed.

FIG. 7 shows an example of an account management screen 700 in a credential management application. In particular, the account management screen 700 is for John Smith's account and includes an image of the user 704. The screen 700 allows the user to edit the user's account by activating command button 702. The screen 700 also allows a user to view account settings by activating command button 706, view signatures associated with the user's account by activating command button 708, and perform device management functions by activating command button 710. The user can also change the user's password using command button 712 and logout of the user's account with command button 714. When the user activates the device management button 710, the application may navigate to a screen displaying an activity log.

FIG. 8 shows an example of an activity log 800 in a credential management application. The activity log 800 includes information for each client device associated with the user's account. For example, the activity log 800 shows an entry 804 for "John's personal phone," which is the current device from which the user is accessing the user's account. The entry 804 also indicates that the last time the phone was used was Sep. 15, 2012 and that it was used at Falls Church. For more details regarding the activities on "John's personal phone," the user may select command button 806. Additionally, the activity log 800 shows an entry 808 for "John's work phone." The entry 808 also indicates that the last time the phone was used was Sep. 12, 2012 and that it was used at Falls Church. For more details regarding the activities on "John's work phone," the user may select command button 810. The screen also includes a back button 802 that navigates the application to the previous screen (e.g., the account management screen 700).

The activity log 800 may also include data indicating each interaction of each client device of the user with the credential management system using the credential management application. The interactions may include searching for other users of the credential management system, sending or receiving data (e.g., a message or file) to another user of the credential management system, accessing a computer device, door, room, elevator, or location associated with the credential management system, participating in a meeting using the credential management system, accessing or performing an operation through the user's credential management application, accessing a database associated with the credential management system. If a user performs interactions one or more of these interactions, the activity log 800 may include information indicating details, such as a time and location, of these interactions.

Figure 9:
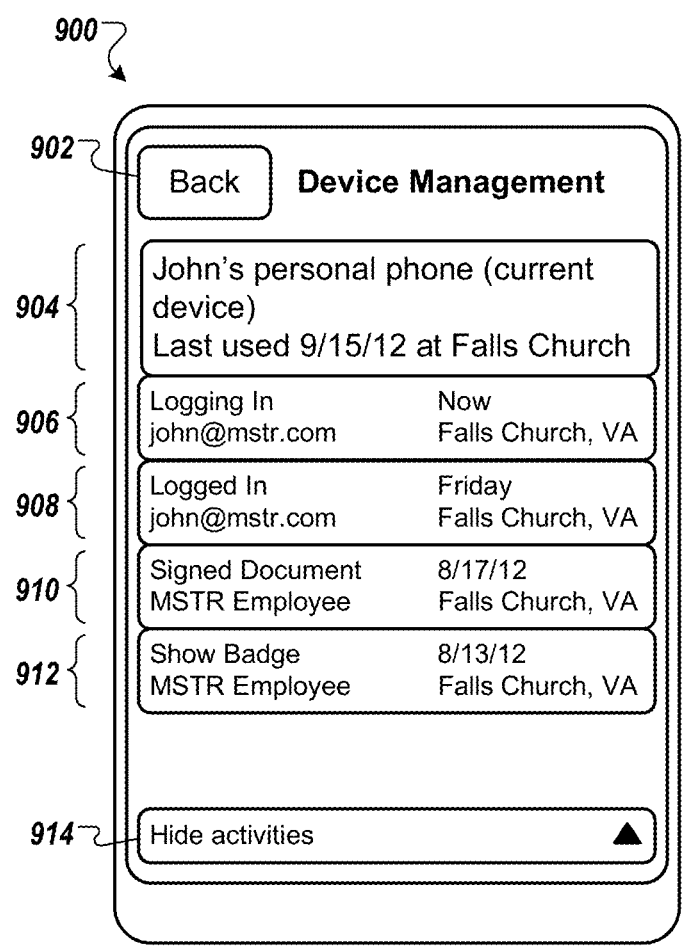
FIG. 9 is an illustration of an example of a detailed activity log in a credential management application.

FIG. 9 shows an example of a detailed activity log 900 in a credential management application. In particular, if the user selects command button 806 from FIG. 8 to view more details of activity on "John's personal phone," the detailed activity log 900 may be displayed. The log 900 shows a header 904 for "John's personal phone," which is the current device that the user is accessing. The header 904 also indicates that the last time the phone was used was Sep. 15, 2012 and that it was used at Falls Church. In some cases, the log 900 will also indicate details associated with the last time the phone or credential was used (e.g., phones was used to call a friend, perform a peer search, etc.). The log 900 includes additional entries with further details on usage of the client device entitled "John's personal phone." The entries include: an entry 906 indicating that the user is currently logged in to their account and the user is located in Falls Church, Va.; an entry 908 indicating that the user logged in to their account on Friday from Falls Church, Va.; an entry 910 indicating that the user signed a document with the user's MicroStrategy employee credential on Aug. 17, 2012 from Falls Church, Va.; and an entry 912 indicating that the user presented the user's MicroStrategy employee credential on Aug. 13, 2012 in Falls Church, Va. The log 900 also includes a hide activities command button 914 to return the user interface to the previous state (e.g., as shown in FIG. 8), and a back command button 902 to navigate the application to the previous screen (e.g., the account management screen 700 shown in FIG. 7). As described below, when the user performs different actions from a client device, information identifying the device (e.g., the certificate) is transmitted to the server that enables the server to track activity from the multiple different client devices of the user.

Figure 10:
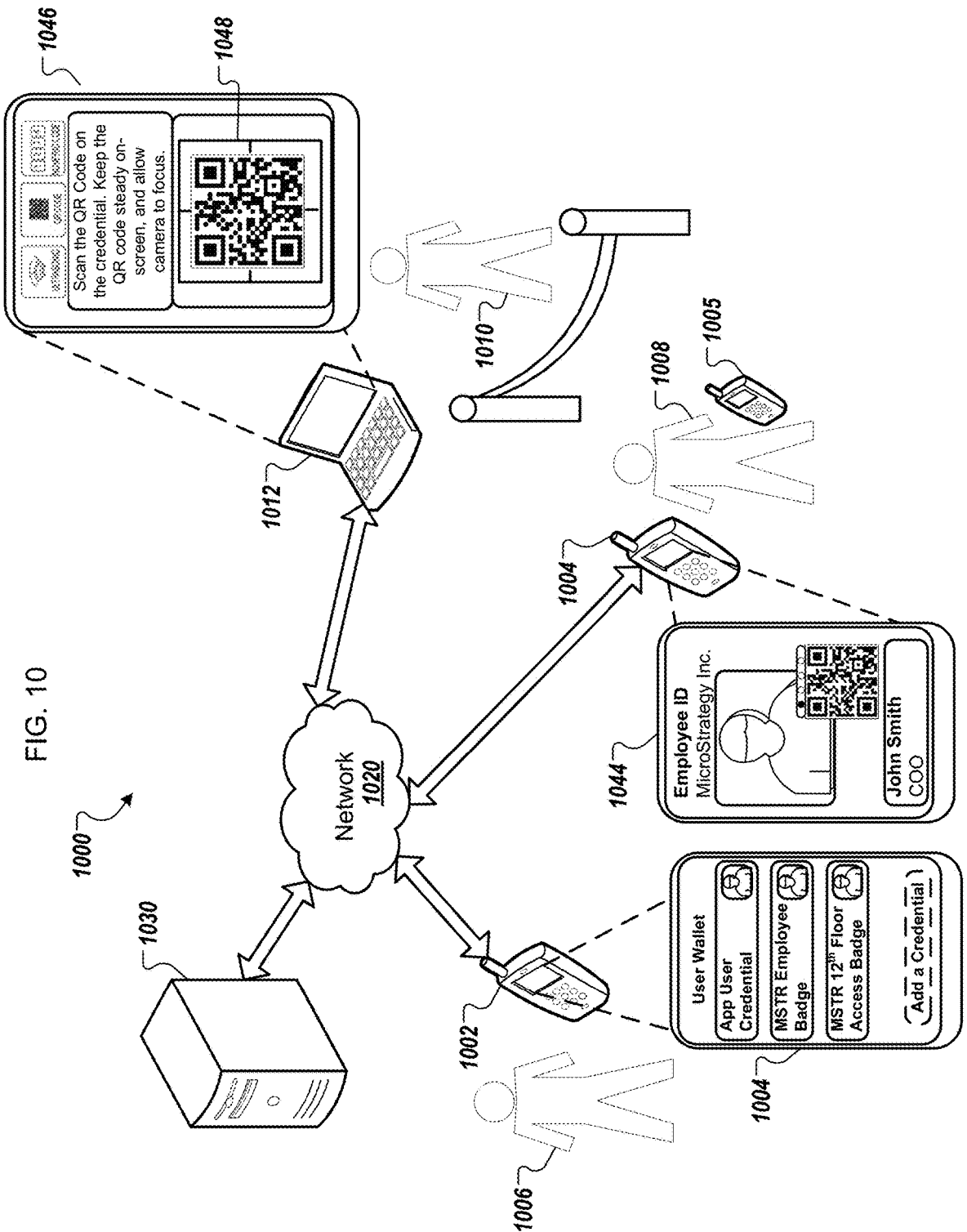
FIG. 10 is an illustration of an example of a credential management system.

FIG. 10 is an exemplary illustration of a credential management system 1000. As an overview, a credential management server 1030 (also referred to in this description as "server 1030") communicates via a network 1020 with client device 1002 operated by user 1006, and client devices 1004, 1005 operated by user 1008. For example, the user 1008 may have a work client device 1004 and a personal client device 1005. The client devices 1002, 1004, and 1005 execute credential management applications that allow them to manage, access, and output multiple credentials. The server 1030 also communicates via network 1020 with a processing system 1012 operated by a validation entity 1010. The validation entity 1010 operates the processing system 1012 to validate credentials presented by the users 1006, 1008 on their client devices 1002, 1004, 1005 by communicating with the server 1030 as described below.

In operation, the server 1030 manages and/or stores one or more credentials, associates users and groups of users with appropriate credentials, grants access to user accounts, and provides credentials to users' client devices and/or processing systems (e.g., operated by credential authorities). The server 1030 can be any suitable computer or collection of computers executing software capable of managing, distributing, and/or validating representations of credentials for users and groups of users via a network 1020 as described herein.

Credentials, user accounts, group accounts, and administrative accounts can be stored in a database (e.g., MySQL, PostgreSQL, MS SQL Server, MongoDB), or other suitable data structure that can be accessed by the server 1030. In some implementations, the server 1030 may access the stored credentials and/or user accounts via web services such as representational state transfer (REST) style services.

As an initial step, the server 1030 creates a credential based on input provided by a credential grantor (e.g., an employer). The credential may include a variety of information such as a credential identifier (e.g., a number or alphanumeric character string that uniquely identifies a credential), a description of an event or location, and one or more designated validation entities.

The server 1030 may present a suitable interface to the credential grantor for creation of credentials. For example, the server 1030 may present a web interface through which grantors can interact via a Web browser. In other aspects, the server 1030 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The server 1030 also may present an interface so that users and/or credential grantors can create user accounts for individual users and groups of users. For example, the server 1030 may present a web interface through which credential grantors can interact via a Web browser. Additionally or alternatively, the server 1030 may be directly accessible via a graphical-user interface or an application on a mobile device. User accounts may be stored in a table or collection of tables in a database, or in any other suitable data structure accessible by the server 1030. The user accounts may include a variety of information such as user name, user title, user identifier (e.g., a number or character string that uniquely identifies a user), one or more addresses (e.g., email addresses and/or mobile phone numbers), identifiers of one or more client devices owned by or otherwise associated with the user, and/or certificates associated with client devices. In some implementations as described below, user accounts may also be associated with a biometric profile of the user. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device 1002, 1004.

To create a new user account with the server 1030, the credential management application may require a new user 1006, 1008 to complete an initial account registration. As part of the initial account registration process, the new user 1006, 1008 may be required to provide biometric information (e.g., a voice sample, fingerprint, retina scan, and/or facial scan, etc.) to the credential management application, which can be transmitted to the server 1030. Subsequently, the server 1030 can generate a biometric profile of the user 1006, 1008 based on the biometric information and associate the biometric profile with the user's account. For example, the user 1006, 1008 may be required to provide a voice sample by uttering a phrase into a microphone of the user's client device 1002, 1004. The client device 1002, 1004 may transmit this voice sample to the server 1030, which can extract features from the voice sample to generate a voice print that identifies the user. The credential management application may automatically register the client device from which the new user completes the initial account registration process as an authorized device for the new user's account.

Upon completion of initial account registration, the server 1030 may transmit a certificate to the client device 1002, 1004 that was used for the registration, for example via the network 620. The server 1030 also may associate the certificate with the user's account and the particular client device. For example, the server 1030 may store the certificate in a memory structure (e.g., a file system or database) and add an entry to the user's account identifying the certificate. A certificate may be, for example, a public key certificate and/or an authorization certificate. In some implementations, a certificate may be in a format specified in the X.509 ITU-T standard.

A public key certificate may be an electronic document that uses a digital signature to bind a public key with an identity. In particular, a public key certificate may include information such as a unique certificate identifier, a user name or user account number, a signature algorithm (RSA, Digital Signature Algorithm (DSA), or Elliptic Curve Digital Signature Algorithm (ECDSA)), a signature, an issuer name, and a public key. The public key certificate can be used to verify that a public key belongs to a user. In a typical public key infrastructure scheme, the signature will be of a certificate authority. In a web of trust scheme, the signature is of either the user (a self-signed certificate) or other users. In either case, the signatures on a certificate are attestations by the certificate signer that the identity information and the public key belong together.

An authorization certificate may be an electronic document that includes authorization information associated with a holder of the certificate. For example, the authorization certificate may indicate that the holder of the certificate is authorized to access a resource, service, or location. In particular, an authorization certificate may include information such as an issuer name, a signature algorithm, a signature, a unique certificate identifier, and identifiers of the resources, services, or locations that the certificate authorizes access to.

An individual may be able to access the individual's user account and credentials from multiple different client devices. When a user 1006, 1008 attempts to login to the application from a client device 1002, 1004 that the user has not previously registered with the credential management server 1030, the credential management application may recognize the client device as a new device. For example, the application may determine that the new device lacks a certificate from the server 1030 by querying a memory location where the certificate would be stored. As a result of determining that the device is a new device, before allowing the user to access the user's account, the credential management application may require the user to authenticate himself/herself at the new device.

In particular, the credential management application may require the user to provide biometric identification (e.g., an utterance, fingerprint, retina scan, and/or face scan, etc.). For example, the credential management application may prompt the user 1006, 1008 to utter a phrase. As referred to herein, a phrase may be a sequence of two or more words selected from one or more dictionaries of words that need not form a grammatical construct. A dictionary as used herein is a data structure in which index values identify words. A dictionary may include different words and their corresponding definitions. In some implementations, the application on the client device 1002, 1004 may select a phrase based on an index that can be randomly generated or generated based on a current time. In some implementations, the user may utter a phrase of their choosing. Alternatively or in addition, the server 1030 may select a phrase and transmit the phrase to the credential management application on the client device 1002, 1004, where the phrase can be displayed to the user. Moreover, in some implementations, rather than transmitting the phrase directly to the credential management application on the client device 1002, 1004, the server 1030 may transmit the phrase to an email address or mobile phone number (via SMS for example) associated with the user account. Advantageously, transmitting the phrase in this manner may provide an additional level of authentication because the user will have to access the email account or SMS inbox to obtain the phrase.

When the user utters the phrase into a microphone of the client device 1002, 1004, the application may encode the utterance and transmit data representing the utterance to the server 1030. The server 1030 can then perform speaker recognition on the phrase uttered by the user 1006, 1008 to authenticate the user. For example, the server 1030 can retrieve a voice print associated with the user's account from a memory structure (e.g., a file system or database), and then compare the characteristics of the utterance with the user's voice print. Alternatively or in addition, the client device 1002, 1004 may obtain a voice print of the user (e.g., receive the voice print from the server 1030 or from a third-party server that stores user voice prints), and then perform speaker recognition using the obtained voice print.

Alternatively or in addition, the user may provide an iris image, a fingerprint image, and/or a facial image for authentication. For example, the user may take an image of the user's eye or face using a camera attached to the client device 1002, 1004. The image may then be transmitted to the server 1030 for verification or verified on the client device 1002, 1004. In some implementations, the client device 1002, 1004 may have a fingerprint scanner operatively coupled to the device, in which case the user 1006, 1008 may provide a scan of one or more fingerprints. The fingerprints can then be transmitted to the server 1030 for verification or verified on the client device 1002, 1004.

In some implementations, the credential management application may employ multi-factor authentication to authenticate a user at a new device. For example, the user may have to provide two or more inputs to authenticate a new device. These inputs may include any suitable combination of: an utterance, an alphanumeric code sent to an email address associated with the user account, an iris scan, a fingerprint scan, and/or a facial scan. For example, the server 1030 may transmit an alphanumeric code to an email address or mobile phone number (via SMS for example) associated with the user account, and require both the alphanumeric code and an utterance that matches the voice print associated with the user account to register a new device.

Multiple different users may be able to register the same client device for use with multiple different user accounts, respectively, for example if several users share the same client device. In particular, each user may login to their user account from the same client device and authenticate himself/herself and receive a certificate associated with their user account as described above. The client device may then store the certificates for the different users in memory. When a user attempts to access the user's user account from the client device, the application can then retrieve the relevant certificate for the user.

Some implementations may include a master client device associated with a user account that has additional privileges. For example, the master client device may have the capability to confirm that a client device may be registered with a user account and/or may be able to deactivate registered client devices. In particular, when a user attempts to login to the user's user account from a new device, in addition to the biometric verification discussed above, the server 1030 may notify the master client device and require confirmation from the master client device prior to registering the new device. The master client device also may deactivate a client device registered with a user account, for example, by transmitting a deactivation message to the server 1030, which then removes the client device from a list of client devices that are permitted to access the user account. The master client device may be the original client device used to setup the user account by default, or may be another device chosen by the user. In some implementations, the server 1030 may require additional levels of authentication to setup or change a master client device. For example, if the server 1030 requires only an utterance to register a normal client device, the server 1030 may require both an utterance and an alphanumeric code transmitted to an email address associated with the user account to establish (e.g., register or change) a master client device.

Upon successful authentication, the server 1030 registers the new device 1002, 1004 as an authorized device for the user's account and transmits a certificate to the new device as described above. The certificate subsequently enables the application to recognize the device as having been registered with the user's account.

In some implementations, a user can have the certificate deleted from a client device. This may provide additional security by causing a user to perform another authentication to access their user account from the device. For example, the client device may automatically delete a certificate from a client device when a user logs out of the user's account from the device. Alternatively or in addition, the user may cause a certificate to be deleted from a client device as part of deactivating the client device from a master client device as described above. In addition, a user may choose to delete a certificate from a client device as an option when the user is logged into their user account from the device.

As an example, Mr. John Smith (user 1008) may request to setup a new user account on the server 1030 using an application executing on his work client device 1004. The client device 1004 prompts Mr. Smith to provide biometric information (e.g., an utterance, a fingerprint, facial scan, and/or iris scan), which is transmitted to the server 1030. The server 1030 can then create database entries representing a user account for Mr. Smith, where the user account includes a biometric profile incorporating the provided biometric information. A credential grantor could then create a row in another table for a group identified as employees of Company X. The grantor and/or server 1030 could then link the database entry for Mr. Smith to the group account for Company X through use of a linking table. Finally, the server 1030 may transmit a certificate to the client device 1004 that allows Mr. Smith to access his new user account from device 1004 without providing biometric identification.

Subsequently, Mr. Smith attempts to access his user account using a credential management application on his personal client device 1005. The client device 1005 (or the server 1030) recognizes that the client device 1005 is not registered with his user account (e.g., by determining that the client device 1005 lacks a certificate associated with the user account). Accordingly, the application on client device 1005 prompts Mr. Smith to provide biometric information to verify his identity. The client device 1005 then transmits this biometric information to the server 1030, which compares the biometric information with the biometric profile associated with Mr. Smith's account to verify Mr. Smith's identity. Finally, the server 1030 transmits a certificate to Mr. Smith's personal client device 1005, thus enabling Mr. Smith to access his user account from device 1005.

Once credentials and user accounts have been created, credential grantors and/or users can associate the credentials with user accounts, or groups of users. For example, the server 1030 may present a web interface through which grantors can interact via a Web browser to link a given credential to a given user or group of users. In other aspects, the server 1030 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1030 also may notify the users that they have been associated with the credential(s), for example by pushing notifications to the respective users' client devices. Such notifications may include the credential identifier.

Once credentials have been associated with appropriate user and/or group accounts, the credentials can then be distributed to client devices for the appropriate users via the network 1020. For example, the network 1020 may be a local area network ("LAN") and a wide area network ("WAN"), e.g., the Internet. In some versions, the server 1030 may communicate with the client devices via SMS or multimedia messaging service (MMS). The server 1030 may access user accounts in a database to locate the appropriate users' client devices.

Credential management applications executed on client devices 1002, 1004, and 1005 can receive the credentials associated with their respective users 1006, 1008 and store them in any suitable memory for later retrieval. A given user 1006, 1008 may be associated with multiple different credentials. Some or all of the credentials associated with a user 1006, 1008 may be accessible on a user's client device 1002, 1004, and 1005. In particular, credential management applications executing on the client devices 1002, 1004, 1005 can then retrieve the credentials so they can be used for generating and presenting a representation of the credential to a validation entity for validation. The client devices 1002, 1004, 1005 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

In some implementations, each time a user 1006, 1008 attempts to access a user account (e.g., to present credentials or manage a user account) from a client device 1002, 1004, the client device 1002, 1004 may transmit a request for authorization to the server 1030. If the client device 1002, 1004 has previously been associated with the user account, the client device 1002, 1004 may have a certificate stored in memory, which can be included with the request to the server 1030. The server 1030 then can verify that the client device 1002, 1004 was associated with the user account by confirming the validity of the certificate. For example, the server 1030 may confirm that information in the certificate (e.g., a certificate serial number and/or signature) matches information from a certificate previously issued by the server 1030 that is associated with the user's account. If the server 1030 verifies that the client device 1002, 1004 is associated with the requested user account, the server 1030 may grant access to the account, for example by transmitting a message to the client device 1002, 1004 including the requested information.

In some implementations, the server 1030 may monitor usage of each registered client device. For example, each time a user logs into the user's user account from a registered client device, the server 1030 may store an entry in a memory structure (e.g., a database or a flat file) storing details of what device was used, and where and when the user logged in (e.g., a device identifier, a user name, user account identifier, email address, location, date and/or time). In particular, when a client device 1002, 1004 submits a login request, the request may include a current location of the client device, for example, based on GPS coordinates, Wi-Fi access point triangulation data, cellular network triangulation data, or IP address information. The server 1030 may also store entries when a client device outputs a representation of a credential for validation (e.g., displays a badge), or signs a document using a credential. For example, when the credential management application on a client device 1002, 1004 outputs a representation for a credential or signs a document using a credential, the client device may transmit information to the server 1030 describing the use (e.g., a device identifier, a user name, user account identifier, the type of use, email address, location, date and/or time). In some cases, when a credential is presented for validation, a processing system 1012 operated by the validation entity may transmit the usage information to the server 1030. In some cases, when a user interacts with other users through the user's client device, information regarding the interaction may be provided to the server 1030. User interactions may include, for example, sending a message or a file to another user, placing a call to another user, or obtaining information regarding another user's identity and interactions. The server 1030 may store an entry including these details.

Additionally, the server 1030 may provide access to the account usage information. For example, when a user logged into a registered client device 1002, 1004 requests account usage information (e.g., by activating command button 710 in FIG. 7 to display device management information), the client device may request account usage information from the server 1030. The server 1030 retrieves the account usage information associated with the account (e.g., by querying a database or accessing a flat file) and then transmits the requested information back to the client device 1002, 1004. The client device 1002, 1004 can then display the account usage information on a user interface, for example as shown in FIG. 9.

FIG. 10 illustrates an example in which the credentials correspond to employee badges for gaining entry into a place of business. Users 1006, 1008 are employees and, consequently, have received credentials related to the business. In addition, the client devices 1002, 1004 have already been registered with the user accounts of their respective users. Accordingly, the client devices 1002, 1004 have certificates stored in memory that allow credential management applications on the client devices 1002, 1004 to access credentials and account management features of the respective user accounts.

For example, the client device 1002 of user 1006 is executing an application that displays a user interface 642 (similar to the user interface 500 shown in FIG. 5) including a user wallet that allows the user 1006 to select from among various credentials. The client device 1004 of user 1008 is executing an application that displays a user interface 1044 such as the employee badge shown in FIG. 6. The user interface 1044 includes a quick response (QR) code. User 1008, at the front of the entry line, has presented the QR code for validation to the validation entity 1010. The validation entity 1010 is a security guard responsible for permitting only authorized individuals to enter the place of business. The credential for accessing the place of business may be represented in a variety of different formats described below, and the validation entity 1010 may be able to validate representations of the credential in any of these different formats.

In some implementations, the client device 1002, 1004 may obtain the user's image from, for example, a memory of the client device 1002, 1004, or a server such as the server 1030. The client device 1002, 1004 may display this image before, after, and/or during presentation of the optical machine-readable representation for authentication of the user 1006, 1008.

After a user 1006, 1008 logs into a user account from the user's client device 1002, 1004 (e.g., by transmitting a request for access to the server 1030 that includes a certificate), the user 1006, 1008 may operate their client device 1002, 1004 to present representations of credentials for validation. For example, the user 1006, 1008 may input a command into the user's client device 1002, 1004 via a man-machine interface (e.g., a user interface on a presence-sensitive display) to select a desired credential. The credential management application executing on the client device 1002, 1004 then generates and outputs the selected representation to a validation entity 1010 for validation.

The representation of a credential may take a variety of different forms. For example, the representation may be an alphanumeric code, a sound signal (e.g., an audible sound signal or an ultrasonic sound signal), an optical machine-readable representation (e.g., a barcode or a quick response (QR) code), a parametrically-generated graphical representation, an animated graphic representation, and/or a phrase, among others.

As referred to herein, an alphanumeric code may be a sequence of numbers and/or letters (e.g., 4 to 24 characters) that is associated with a credential and a user. In some instances, a given alphanumeric representation will only be valid for a certain time period. In operation, applications for credential validation execute on the client device 1002, 1004 and the processing system 1012. The server 1030 associates an alphanumeric code with a user 1006, 1008 and a credential, and distributes the alphanumeric code to the user's client device 1002, 1004. When the user 1006 presents the alphanumeric code to the validation entity 1010, the processing system 1012 can validate the alphanumeric code by communicating with the server 1030, and receiving a response indicating whether the presented alphanumeric code matches a valid alphanumeric code (e.g., an alphanumeric code that currently is associated with a user to whom a valid credential has been granted at the point in time the processing system 1012 communicates the alphanumeric code to the server 1030).

As referred to herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers and any other suitable data. In other implementations, the optical machine-readable representations may encode other identifiers that are linked to or otherwise associated with credential identifiers. As an example, credential identifiers for the users 1006, 1008 may be encoded using QR codes.

The client device 1002, 1004 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

When the client device 1002, 1004 displays an optical machine-readable representation, the validation entity 1010 can operate the processing system 1012 to scan the portion of the client device's display showing the representation and decode the representation to generate a set of alphanumeric characters that were encoded in the representation. In particular, the processing system 1012 may provide a user interface 1046 that includes a reticle 1048 defining a field of view from a camera operatively coupled to the processing system 1012. This reticle can be used by the validation entity 1010 to scan the optical machine-readable representation from the relevant portion of the client device's display 1044.

The processing system 1012 may use any suitable mechanism to scan and decode the optical machine-readable representation. For example, the processing system 1012 may access a function or library routine that captures and decodes QR codes and/or barcodes using a camera operatively coupled to the processing system 1012. Suitable libraries may include, for example, RedLaser or Zxing.

The processing system 1012 can then validate the optical machine-readable representation by communicating data corresponding to the alphanumeric characters that were encoded in the representation to the server 1030. In response, the processing system 1012 receives a response indicating whether the presented optical machine-readable representation corresponds to a credential that currently is associated with a user to whom a valid credential has been granted at the point in time the processing system 1012 communicates the alphanumeric code to the server 1030.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The sound signal may encode data including or representing credential identifiers and any other suitable data. In other implementations, the sound signal may encode other identifiers that are linked to or otherwise associated with credential identifiers. As an example, credential identifiers for the users 1006, 1008 may be encoded using sound signals. The client device may use any suitable technique for encoding the sound signal. For example, the client device may call a function or library routine that encodes data into sound signals such as the Zoosh SDK by Naratte, Inc. The client device 1002, 1004 can then output the sound signal from a speaker coupled to the client device for reception by the processing system 1012.

When the client device 1002, 1004 outputs a sound signal, the validation entity 1010 can operate the processing system 1012 to receive the sound signal at a speaker of the processing system and decode the sound signal to generate a set of alphanumeric characters that were encoded in the sound signal. The processing system 1012 may use any suitable mechanism to receive and decode the sound signal. The processing system 1012 can then validate the alphanumeric characters by communicating with the server 1030. In response, the processing system 1012 receives a response indicating whether the alphanumeric characters encoded in the sound signal correspond to a credential that is currently is associated with a user to whom a valid credential has been granted at the point in time the processing system 1012 communicates the alphanumeric characters to the server 1030.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 1002, 1004 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 1012 obtains a credential identifier and a time, and generates a parametrically generated graphical representation for the credential in the same manner. When the timing device at the processing system 1012 is synchronized with the timing devices at client device 1002, 1004, the parameters generated at the processing system 1012 should be identical (or nearly identical) to those of the client device 1002, 1004 when the credential identifiers are the same. The graphical representation generated by processing system 1012 should therefore match the graphical representations on the client device 1002, 1004 allowing the validation entity 1010 to visually validate the credential on the client device 1002, 1004.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 1002, 1004 may access the stored graphical representations by way of index values, where an index value may correspond to a single representation. In operation, a client device 1002, 1004 obtains a credential identifier (e.g., from a memory of the client device) and a time (e.g., from a timing device of the client device), and selects an animated graphical representation for the credential by using the credential identifier and the time to generate an index value. Similarly, for validation, the processing system 1012 obtains a credential identifier and a time, and selects an animated graphical representation for the credential in the same manner. When the timing device at the processing system 1012 is synchronized with the timing device at client device 1002, 1004 the index values generated at the processing system 1012 should be substantially identical to those of the client device 1002, 1004 when the credential identifiers are the same. The graphical representation selected by processing system 1012 should therefore match (or nearly match) the graphical representations on the client devices 1002, 1004 allowing the validation entity 1010 to visually validate the credential on the client device 1002, 1004.

A phrase may be a sequence of two or more words selected from one or more dictionaries of words that need not form a grammatical construct. In operation, applications for credential validation executing on the client device 1002, 1004 and the processing system 1012 can access a common set of dictionaries for generating phrases, so that when the applications reference the same index values in the same dictionaries, at substantially the same time, they can select the same phrases. Thus, the processing system 1012 displays the same phrase as the client devices 1002, 1004 which enables the validation entity 1010 to validate the phrases at the client device 1002, 1004.

When the server 1030 receives a validation request message from the processing system 1012, it attempts to confirm that the presented representation of the credential is valid. In particular, the server 1030 may decode a set of alphanumeric characters and/or parse an alphanumeric code to obtain the credential identifier. The server 1030 can then access the corresponding credential using the credential identifier (e.g., from a database by querying using the credential identifier). Upon retrieving the credential, the server 1030 can determine whether the presented representation for the credential was valid by comparing data received in the validation request message with data associated with the retrieved credential. For example, the server 1030 may determine that a user identifier included in the validation request corresponds to an authorized user of the credential. In some implementations, the processing system 1012 may perform some or all of the validation of the representations for the credential.

In some implementations, if the credential representation is validated, the validation response may include an image, a name, and/or other data relating to the validated user including, e.g., a copy of the user's credential. The server 1030 may obtain information relating to the user (e.g., an image of the user) from the credential grantor as described above. For example, the processing system 1012 may display the user's name and the user's image. In some implementations, responsive to receiving a validation response from the server 1030, the processing system 1012 may obtain the user's image from, for example, a memory of the processing system 1012, the server 1030, a server made accessible by the credential grantor, or another server. The processing system 1012 may then output the user's image to a display operatively coupled to the processing system 1012.

Upon successful validation, the server 1030 sends the processing system 1012 a validation response indicating that the representation for the credential was valid (e.g., the set of alphanumeric characters decoded from the representation matches a set of alphanumeric characters generated at the server 1030). The processing system 1012 may then provide an indication to the validation entity 1010 that the representation presented by the user 1008 was valid. The validation entity 1010 may then permit the user 1008 to enter the place of business.

While shown in FIG. 10 as a person, the validation entity 1010 can be any agent capable of validating representations of credentials presented by users. As an example, the validation entity 1010 could be a software application executing on the processing system 1012 that processes a representation for a credential received from a client device 1002, 1004, decodes the representation to generate an alphanumeric set of characters, transmits the alphanumeric set of characters to the server 1030, and receives a response from the server 1030 indicating that the representation is valid. The software application could then control an automated gate to permit user 1008 to enter. The processing system 1012 can also be any suitable computer or set of computers capable of communicating with the server 1030 via network 1020, such as a mobile phone, smart phone, PDA, tablet computer, laptop or desktop computer, or other stationary or portable device, that includes one or more processors and non-transitory computer readable media.

Representations for multiple credentials may be displayed and/or presented concurrently. This may be implemented, for example, when credentials represent a hierarchy of access. As an example, if Mr. John Smith is an employee of MicroStrategy Incorporated and also is authorized to access the Executive Suite of MicroStrategy's headquarters, he may have two credentials, i.e., a first credential identifying Mr. Smith as an employee who is authorized to enter the headquarters, and a second authorizing Mr. Smith to access the Executive Suite. In such implementations, representations for the first credential and the second credential may both be presented at the same time or in series so that a validation entity can permit Mr. Smith access to the Executive Suite.

Figure 11:
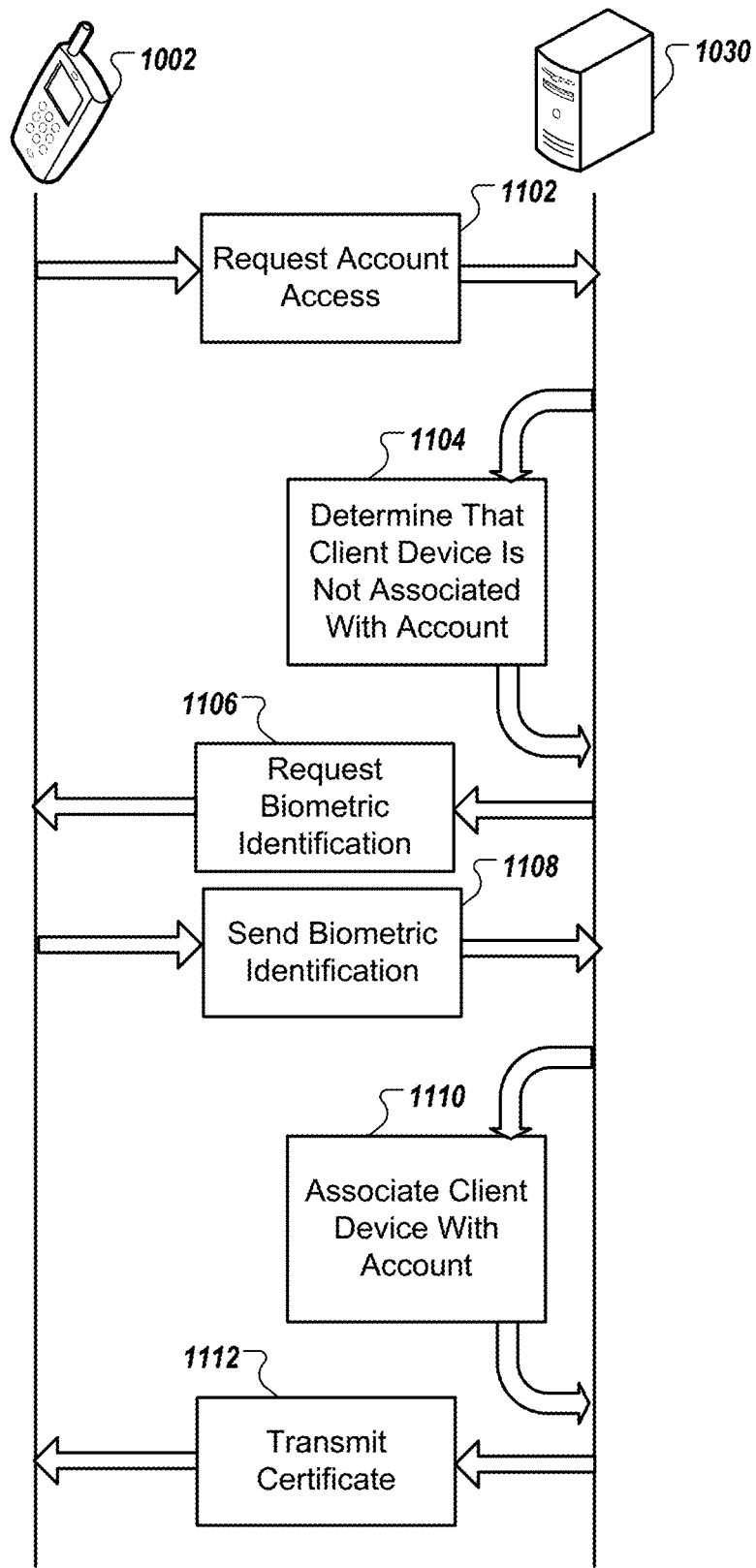
FIG. 11 is a messaging diagram that illustrates examples of messages between a client device and a server in a credential management system.

FIG. 11 shows sample messages between a client device 1002 and a server 1030 in a credential management system. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, a user 1006 operates a client device 1002 to attempt to access a user account of a credential management application. The client device 1002 transmits a message 1102 to the server 1030 requesting account access (e.g., by providing an e-mail address or username and a password). In response, in step 1104, the server 1030 determines that the requesting client device 1002 is not currently associated with the specified user account. The server 1030 then transmits a message 1106 to the client device 1002 notifying the user 1006 that the client device is not currently associated with the account, and prompting the user to provide biometric identification (e.g., an utterance, facial scan, iris scan, and/or fingerprint) to authenticate the user. As discussed above, the user 1006 provides the requested biometric identification and the client device 1002 transmits this information to the server 1030 in message 1108.

Upon confirming that the provided biometric identification matches a biometric profile associated with the user account, the server 1030 associates the client device 1002 with the user account in step 1110. For example, the server 1030 may compare characteristics of an utterance from the user 1006 with a voice print to confirm the identity of the user. Once the client device 1002 is registered with the user account, the server 1030 transmits a certificate to the client device 1002 in message 1112. Subsequently, the client device 1002 can access the user account using the certificate without having to provide biometric identification. The process described in relation to the messages in FIG. 11 could be repeated for multiple different users of the client device 1002 to register the device 1002 with their accounts. In addition, this process could be repeated at multiple different client devices for the same user to register the different client devices with his/her user account.

Figure 12:
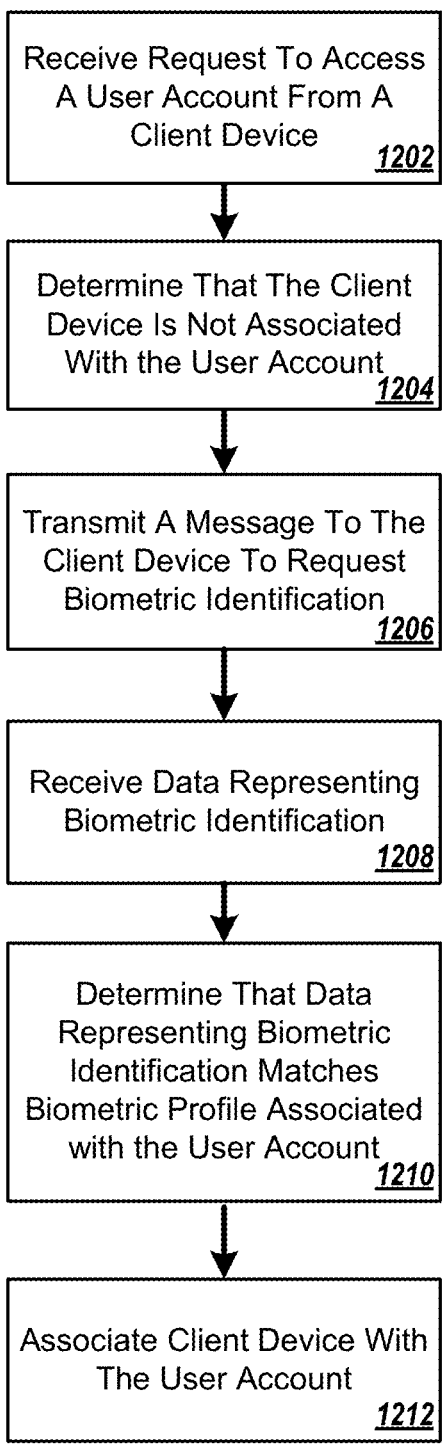
FIG. 12 is a flowchart of an example process for granting access to a user account.

FIG. 12 shows an example process for granting access to a user account. In step 1202, a server 1030 receives a request from a client device 1002 to access a user account of a user (e.g. by providing an e-mail address or username and a password). The user account provides access to one or more credentials associated with the user.

In step 1204, the server 1030 determines that the client device 1002 is not associated with the user account. For example, the server 1030 may determine that the request from the client device does not include a certificate associated with the user account. Alternatively or in addition, the request may include a client device identifier of the client device 1002, and the server 1030 may determine that the client device identifier is not associated with the user account.

In response to determining that the client device is not associated with the user account, in step 1206, the server 1030 transmits a message to the client device 1002. The message prompts the user to provide biometric identification. For example, the message may prompt the user to utter a phrase so as to provide a voice sample. The phrase may be one or more words randomly selected by the server or the client device from one or more dictionaries, or may be chosen by the user. The message may be transmitted for in-app display on the client device, or may be transmitted via email to an email address associated with the user account. Alternatively or in addition, the message may prompt the user to provide a fingerprint, provide an iris scan, and/or provide a facial scan.

In step 1208, the server 1030 receives data representing biometric identification of the user from the client device

1002. For example, the server 1030 may receive data encoding a voice sample corresponding to an utterance of a phrase, a fingerprint, an iris scan, and/or a facial scan. The server 1030 then determines that the data representing the biometric identification of the user matches a biometric profile of the user associated with the user account in step 1210. For example, the server 1030 may determine that the voice sample of the user matches a voice print of the user. In implementations where the phrase was transmitted to an email address associated with the user account (or some other destination accessible by the user associated with the user account), the server 1030 may also perform speech recognition to determine whether the voice sample of the user corresponds to an utterance of the phrase from the email transmitted to the email address associated with the user account. Alternatively or in addition, the server 1030 may determine that a fingerprint from the client device matches a fingerprint associated with the user account, that an iris scan from the client device matches an iris image associated with the user account, and/or that a facial scan from the client device matches a facial image associated with a user account.

Finally, in response to determining that the data representing the biometric identification of the user matches a biometric profile of the user associated with the user account, the server 1030 associates the client device 1002 with the user account in step 1212. As a result, the user is enabled to access the user account, and the associated one or more credentials, from the client device 1002. In some implementations, after determining that the data representing the biometric identification of the user matches a biometric profile of the user associated with the user account, the server 1030 transmits a certificate associated with the user account to the client device 1002.

After the client device 1002 has been associated with the user account, the client device 1002 may send a second request to access the user account, where the second request includes a certificate associated with the user account. The server 1030 receives this second request from the client device 1002 and determines that the client device is associated with the user based on the certificate (e.g., by comparing information in the transmitted certificate with information accessed by the server 1030 for a corresponding certificate associated with the user account). The server 1030 then provides the client device 1002 with access to the user account.

After the client device 1002 has been associated with the user account, the client device 1002 may transmit a request to the server 1030 to perform an action associated with the user account, where the request may include a certificate. For example, the client device 1002 may request to access credentials associated with the user account or view usage information of the user account. The server 1030 then determines that the client device 1002 is associated with the user account based on the certificate. Accordingly, the server 1030 authorizes the client device 1002 to perform the requested action and stores an indication (e.g., a database entry or flat file entry) that the action was performed by the client device. The server 1030 also associates the indication with the relevant user account so that it can be retrieved later.

In some implementations, multiple different client devices may be associated with a user account, such that a user can access the user's user account from several devices. For example, if a first client device 1004 is not currently associated with a user account, then the user may authenticate the user's identity as described above and receive a certificate on the first client device 1004. Subsequently, the user can login to their user account and perform actions (e.g., presenting representations for credentials) from the first client device. The server 1030 can then monitor use of the first client device to access the user account. The user may then authenticate the user's identity and receive a certificate on a second client device, which can then be used to login to their user account and perform actions as described above.

In some implementations, multiple different users may access their user accounts from the same client device. For example, if a client device 1004 is not currently associated with a user account of a first user, then the first user may authenticate the first user's identity as described above and receive a certificate for the first user's user account on the client device 1004. Subsequently, the first user can login to the first user's user account and perform actions (e.g., presenting representations for credentials) from the first client device. The server 1030 can then monitor use of the client device to access the first user account. A second user may then authenticate the second user's identity and receive a certificate for the second user account on the same client device, which can then be used to login to the second user's user account and perform actions as described above.

In some implementations, the server 1030 may transmit an alphanumeric code to an email address associated with the user account to provide an additional level of authentication. The server 1030 may receive an alphanumeric code from the client device 1002, 1004, or 1005 with a request and then determine whether the alphanumeric code received at the server 1030 matches the alphanumeric code transmitted from the server 1030 to the email address associated with the user before associating a client device with the user account.

While described as being performed at the server 1030, the authentication of the biometric information may be performed partially or completely at the client device 1002, 1004, or 1005. For example, the client device 1002, 1004, or 1005 may access biometric identification of the user and compare it with biometric information provided by the user.

Features in the described implementations can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the claims.

The invention claimed is:

1. A method performed by an electronic device, the method comprising:
receiving, by the electronic device and from a server system over a communication network, an authentication request for a user, wherein the authentication request is associated with a request for access to a secured resource;
determining, by the electronic device, that a wearable device previously associated with the user is in proximity to the electronic device;
in response to determining that the wearable device previously associated with the user is in proximity to the electronic device, sending, by the electronic device, a notification to the wearable device that includes data that causes the wearable device to provide an approval option and a denial option;
receiving, by the electronic device, approval data indicating user selection of the approval option using the wearable device to approve access to the secured resource in response to the notification;
with the wearable device and the electronic device requesting neither credential data nor biometric data from the user after the electronic device receives the authentication request, authenticating, by the electronic device, the user based on the determination that the wearable device is in proximity to the electronic device; and
based on authenticating the user and based on receiving the approval data, providing, by the electronic device and to the server system over the communication network, data indicating approval of the authentication request associated with the request for access to the secured resource in response to receiving the approval data from the wearable device.

2. The method of claim 1, comprising determining that the wearable device has been continuously worn since the user authenticated to the wearable device; and
wherein authenticating the user is based on determining that the wearable device has been continuously worn since the user authenticated to the wearable device.

3. The method of claim 2, wherein determining that the wearable device has been continuously worn since the user authenticated to the wearable device comprises determining that the wearable device has been continuously worn based on skin sensor data or heartbeat data from the wearable device.

4. The method of claim 1, wherein determining, by the electronic device that the wearable device associated with the user is in proximity to the electronic device comprises:
receiving, by the electronic device, a signal from the wearable device over a short-range wireless connection; and
determining that the wearable device is in proximity of the electronic device based on the received signal from the wearable device.

5. The method of claim 1, wherein determining, by the electronic device, that the wearable device associated with the user is in proximity to the electronic device comprises determining that the wearable device has been registered with a user account for the user.

6. The method of claim 1, wherein the wearable device is a watch.

7. The method of claim 1, wherein the electronic device is a mobile phone, the mobile phone being configured to output an alert in response to receiving the authentication request when a wearable device is not in proximity to the mobile phone;
wherein the method includes determining, by the mobile phone, to not output the alert corresponding to the authentication request based on determining that the wearable device associated with the user is in proximity to the electronic device; and
wherein sending the notification to the wearable device comprises sending the notification to the wearable device instead of outputting the alert at the mobile phone.

8. The method of claim 1, wherein receiving the authentication request comprises receiving, by the electronic device, an authentication request from a resource device over a short-range wireless connection; and
wherein providing the data indicating approval of the authentication request comprises providing the data indicating approval of the authentication request to the resource device over the short-range wireless connection.

9. The method of claim 1, further comprising:
determining, by the electronic device, that the wearable device is locked or has not been worn continuously since a most recent authentication of the user to the wearable device;
in response to determining that the wearable device is locked or has not been worn continuously since the most recent authentication of the user to the wearable device, sending data to the wearable device requesting that the user authenticate to the wearable device; and
receiving, by the electronic device, data indicating that the user authenticated to the wearable device;
wherein providing the data indicating approval of the authentication request in response to receiving the approval data from the wearable device is based on data indicating that the user authenticated to the wearable device.

10. The method of claim 1, wherein sending the sending the notification to the wearable device comprises forwarding the authentication request received by the electronic device to the wearable device.

11. The method of claim 1, wherein the wearable device has a touchscreen display, and the notification from the electronic device is configured to cause the wearable device to display an approval control and a denial control on the touchscreen display of the wearable device, the approval control being configured to approve the authentication with a single interaction of the user.

12. The method of claim 1, wherein receiving the authentication request comprises receiving an authentication request corresponding to a particular user credential issued to the user, the particular user credential being different from credentials of the user to access the electronic device and the wearable device.

13. The method of claim 12, further comprising determining, by the electronic device, a policy associated with the particular credential;
wherein the policy indicates that an additional authentication factor is required when one or more conditions occur;
and wherein the method further comprises:
providing, by the electronic device, a notification requesting user input for the additional authentication factor;
after providing the notification, receiving, by the electronic device, user input for the additional authentication factor; and
based on the policy associated with the particular credential, providing, by the electronic device, the user input for the additional authentication factor to a server system.

14. The method of claim 12, further comprising determining that the particular user credential is valid;
wherein sending the notification to the wearable device or providing the data indicating approval of the authentication request is performed in response to determining that the particular user credential is valid.

15. The method of claim 1, wherein the request for access to the secured resource is a request initiated using a device other than the electronic device and the wearable device.

16. The method of claim 1, wherein authenticating the user is performed without the electronic device receiving credential data from the wearable device and without the electronic device receiving biometric data from the wearable device.

17. One or more non-transitory computer-readable media storing instructions that, when executed by one or more processors of an electronic device, cause the electronic device to perform operations comprising:
receiving, by the electronic device and from a server system over a communication network, an authentication request for a user, wherein the authentication request is associated with a request for access to a secured resource;
determining, by the electronic device, that a wearable device previously associated with the user is in proximity to the electronic device;
in response to determining that the wearable device previously associated with the user is in proximity to the electronic device, sending, by the electronic device, a notification to the wearable device that includes data that causes the wearable device to provide an approval option and a denial option;
receiving, by the electronic device, approval data indicating user selection of the approval option using the wearable device to approve access to the secured resource in response to the notification;
with the wearable device and the electronic device requesting neither credential data nor biometric data from the user after the electronic device receives the authentication request, authenticating, by the electronic device, the user based on the determination that the wearable device is in proximity to the electronic device; and
based on authenticating the user and based on receiving the approval data, providing, by the electronic device and to the server system over the communication network, data indicating approval of the authentication request associated with the request for access to the secured resource in response to receiving the approval data from the wearable device.

18. An electronic device comprising:
one or more processors; and
one or more non-transitory computer-readable media storing instructions that, when executed by one or more processors, cause the electronic device to perform operations comprising:
storing, by the electronic device, an identifier corresponding to a particular secured resource that is accessible using a credential of a user;
providing, by the electronic device, the stored identifier corresponding to the particular secured resource to a server system;
after providing the stored identifier, receiving, by the electronic device, a push notification initiated by the server system in response to an attempt by the user to access the particular secured resource;
determining, by the electronic device, that a wearable device previously associated with the user is in proximity to the electronic device;
in response to determining that the wearable device associated with the user is in proximity to the electronic device, forwarding, by the electronic device, the received push notification to the wearable device for output by the wearable device;
receiving, by the electronic device, approval data indicating user interaction with the wearable device approving authentication in response to output of the push notification by the wearable device; and
providing, by the electronic device and to the server system, data indicating approval of the authentication in response to receiving the approval data from the wearable device.

19. The system of claim 18, wherein the operations further comprise:
- scanning, by the electronic device, an optical machine-readable code that is displayed by a computing system and that corresponds to the particular secured resource; and
- deriving, by the electronic device, the identifier from the optical machine-readable code scanned by the electronic device.

20. The system of claim 19, wherein the particular secured resource is a web page or a virtual private network.

21. The system of claim 18, wherein the operations further comprise:
- detecting, by the electronic device, the presence of a physical resource near the electronic device;
- determining, by the electronic device, that one of the credentials of the user provides access to the physical resource; and
- in response to detecting the presence of a physical resource near the electronic device and determining that one of the credentials of the user provides access to the physical resource transmitting, by the electronic device, data to the wearable device that causes the wearable device to indicate the physical resource to the user and provide an interactive user interface element that is selectable to initiate an action involving the physical resource.

\* \* \* \* \*

UNITED STATES PATENT AND TRADEMARK OFFICE
CERTIFICATE OF CORRECTION

| | | |
|---|---|---|
| PATENT NO. | : 10,701,067 B1 | Page 1 of 1 |
| APPLICATION NO. | : 15/136449 | |
| DATED | : June 30, 2020 | |
| INVENTOR(S) | : Siamak Ziraknejad, Victor Pena and Michael J. Saylor | |

It is certified that error appears in the above-identified patent and that said Letters Patent is hereby corrected as shown below:

In the Claims

In Claim 19, Column 49, Line 1, change "system" to --electronic device--.

In Claim 20, Column 49, Line 10, change "system" to --electronic device--.

In Claim 21, Column 49, Line 12, change "system" to --electronic device--.

Signed and Sealed this
Twenty-fifth Day of August, 2020

Andrei Iancu
*Director of the United States Patent and Trademark Office*